US012395296B2

(12) United States Patent
Takata et al.

(10) Patent No.: US 12,395,296 B2
(45) Date of Patent: *Aug. 19, 2025

(54) TRANSMISSION DEVICE, RECEPTION DEVICE, TRANSMISSION METHOD, AND RECEPTION METHOD FOR RANDOM ACCESS COMMUNICATION

(71) Applicant: Panasonic Intellectual Property Corporation of America, Torrance, CA (US)

(72) Inventors: Tomofumi Takata, Ishikawa (JP); Hidetoshi Suzuki, Kanagawa (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,881

(22) Filed: May 31, 2024

(65) Prior Publication Data
US 2024/0324024 A1    Sep. 26, 2024

Related U.S. Application Data

(63) Continuation of application No. 17/255,912, filed as application No. PCT/JP2019/037369 on Sep. 24, 2019, now Pat. No. 12,041,660.

(30) Foreign Application Priority Data

Dec. 28, 2018 (JP) ................................ 2018-247260

(51) Int. Cl.
*H04W 74/0833* (2024.01)
*H04L 5/00* (2006.01)
*H04W 72/23* (2023.01)

(52) U.S. Cl.
CPC ....... *H04W 74/0833* (2013.01); *H04L 5/0048* (2013.01); *H04W 72/23* (2023.01)

(58) Field of Classification Search
CPC ........... H04W 74/08333; H04W 72/23; H04W 74/0836; H04W 74/0838
See application file for complete search history.

(56) References Cited

U.S. PATENT DOCUMENTS

2011/0287776 A1    11/2011    Vujcic
2013/0242730 A1    9/2013    Pelletier et al.
(Continued)

FOREIGN PATENT DOCUMENTS

EP    3855850 A1    7/2021
JP    5778629 B2    9/2015
(Continued)

OTHER PUBLICATIONS

Ericsson, "Msg3 size for CCCH payload," R2-1803202, Agenda Item: 10.3.1.4.3, 3GPP TSG-RAN WG2 #101, Athens, Greece, Feb. 26-Mar. 2, 2018. (3 pages).
(Continued)

*Primary Examiner* — Noel R Beharry
*Assistant Examiner* — Angelie T Ngo
(74) *Attorney, Agent, or Firm* — Seed IP Law Group LLP

(57) ABSTRACT

In the present invention, a terminal can appropriately perform a random-access process. In a terminal (100), a wireless transmission unit (111) transmits a random-access signal including at least a data part. A rank determination unit (107) controls the configuration of the data part on the basis of a parameter regarding the transmission of the random-access signal.

4 Claims, 20 Drawing Sheets

(56) References Cited

U.S. PATENT DOCUMENTS

| | | | |
|---|---|---|---|
| 2016/0073431 | A1 | 3/2016 | Park et al. |
| 2018/0124626 | A1 | 5/2018 | Tsai et al. |
| 2018/0124724 | A1 | 5/2018 | Tsai et al. |
| 2018/0279376 | A1 | 9/2018 | Dinan et al. |
| 2019/0281635 | A1 | 9/2019 | Kwak et al. |
| 2019/0320467 | A1 | 10/2019 | Freda et al. |
| 2019/0342896 | A1 | 11/2019 | Kusashima et al. |
| 2019/0357268 | A1* | 11/2019 | Zhao .................... H04L 5/10 |
| 2019/0357274 | A1 | 11/2019 | Lee et al. |
| 2020/0120709 | A1 | 4/2020 | Bergquist et al. |
| 2020/0145967 | A1 | 5/2020 | Park et al. |
| 2021/0112596 | A1 | 4/2021 | Park |
| 2021/0307082 | A1 | 9/2021 | Wang et al. |
| 2021/0321462 | A1* | 10/2021 | Takahashi ........... H04W 74/006 |
| 2021/0337601 | A1 | 10/2021 | Agiwal et al. |
| 2024/0179747 | A1* | 5/2024 | Agiwal ................ H04W 24/08 |

FOREIGN PATENT DOCUMENTS

| | | | |
|---|---|---|---|
| WO | WO 2018062925 | A1 | 4/2018 |
| WO | WO 2018084208 | A1 | 5/2018 |
| WO | 2020034319 | A1 | 2/2020 |

OTHER PUBLICATIONS

Huawei, HiSilicon, "Selection of random access preamble in NR," R2-1710773, Revision of R2-1709258, Agenda item: 10.3.1.4.3, 3GPP TSG-RAN WG2 Meeting #99bis, Prague, Czech Republic, Oct. 9-13, 2017. (3 pages).

Institute for Information Industry (III), "Considerations on Common 2-Step RACH," R2-1818162, Agenda item: 11.2.1.1, 3GPP TSG-RAN WG2 Meeting #104, Spokane, USA, Nov. 12-16, 2018. (4 pages).

Samsung, "Initial access and mobility procedure for NR-U," R1-1806762, Agenda item: 7.6.4.2, 3GPP TSG RAN WG1 Meeting #93, Busan, Korea, May 21-25, 2018. (4 pages).

ZTE, "On early data transmission for eMTC," R1-1717214, Agenda item: 6.2.5.2, 3GPP TSG RAN WG1 Meeting #90bis, Prague, Czechia, Oct. 9-13, 2017. (4 pages).

* cited by examiner

| Preamble number | Rank value of msg A data part |
|---|---|
| 0 | 1 |
| 1 | 1 |
| 2 | 1 |
| 3 | 2 |
| 4 | 2 |

Group A: rows 0–2; Group B: rows 3–4

FIG. 11

| Preamble number | Rank value of msg A data part | Path loss |
|---|---|---|
| 0 | 1 | Large |
| 1 | 1 | Large |
| 2 | 1 | Large |
| 3 | 2 | Small |
| 4 | 2 | Small |

Group A: rows 0–2; Group B: rows 3–4

FIG. 12

| Preamble number | Rank value of msg A data part | Information amount (bits) of Data part in msg A |
|---|---|---|
| 0 | 1 | Small |
| 1 | 1 | Small |
| 2 | 1 | Small |
| 3 | 2 | Large |
| 4 | 2 | Large |

Group A: rows 0–2; Group B: rows 3–4

FIG. 13

| Preamble number | Rank value of msg A data part | Information amount (bits) of Data part in msg A + Path loss |
|---|---|---|
| 0 | 1 | Information amount: Small Path loss: Large |
| 1 | 1 | Information amount: Small Path loss: Large |
| 2 | 1 | Information amount: Small Path loss: Small |
| 3 | 2 | Information amount: Large Path loss: Small |
| 4 | 2 | Information amount: Large Path loss: Small |

Group A: preambles 0, 1, 2
Group B: preambles 3, 4

FIG. 14

| Preamble number | Rank value of msg A data part | Information amount (bits) of Data part in msg A + Path loss |
|---|---|---|
| 0 | 1 | Information amount: Small Path loss: Large |
| 1 | 1 | Information amount: Small Path loss: Large |
| 2 | 2 | Information amount: Small Path loss: Small |
| 3 | 4 | Information amount: Large Path loss: Small |
| 4 | 4 | Information amount: Large Path loss: Small |

Group A: preambles 0, 1
Group B: preamble 2
Group C: preambles 3, 4

FIG. 15

| Preamble number | Whether Precoding is identical between Preamble part and Data part |
|---|---|
| 0 | Identical |
| 1 | Identical |
| 2 | Different |
| 3 | Different |
| 4 | Different |

Group A: preambles 0, 1
Group B: preambles 2, 3, 4

FIG. 24

| Preamble number | Whether Precoding is identical between Preamble part and Data part | DMRS symbol count |
|---|---|---|
| 0 | Identical | 0 |
| 1 | Identical | 1 |
| 2 | Different | 1 |
| 3 | Different | 2 |
| 4 | Different | 2 |

Group A: preamble 0
Group B: preamble 1
Group C: preamble 2
Group D: preambles 3, 4

FIG. 25

| Preamble number | Whether Precoding is identical between Preamble part and Data part | DMRS symbol count | Moving speed |
|---|---|---|---|
| 0 | Identical | 0 | Slow |
| 1 | Identical | 1 | Fast |
| 2 | Different | 1 | Slow |
| 3 | Different | 2 | Fast |
| 4 | Different | 2 | Fast |

Group A: preamble 0
Group B: preamble 1
Group C: preamble 2
Group D: preambles 3, 4

FIG. 26

| RACH type | Preamble number | Rank value of msg A data part |
|---|---|---|
| CBRA | 0 | 1 |
| CBRA | 1 | 1 |
| CBRA | 2 | 1 |
| CFRA | 3 | 1 |
| CFRA | 4 | 2 |

FIG. 27

TRANSMISSION DEVICE, RECEPTION DEVICE, TRANSMISSION METHOD, AND RECEPTION METHOD FOR RANDOM ACCESS COMMUNICATION

TECHNICAL FIELD

The present disclosure relates to a transmission apparatus, a reception apparatus, a transmission method, and a reception method.

BACKGROUND ART

In the standardization of 5G, a new radio access technology (NR) that is not necessarily backward compatible with LTE/LTE-Advanced has been discussed in 3GPP.

Studies have been carried out on introducing 2-step random access (also referred to as a 2-step RACH) in addition to 4-step random access (also referred to as a 4-step Random Access Channel (RACH)), as a random access procedure in NR (see, for example, Non-Patent Literature 1).

CITATION LIST

Non-Patent Literature

NPL 1

R2-1809940, LG Electronics Inc., "Considerations on 2-Step CBRA procedure for NR-U SA", 3GPP TSG-RAN WG2 Meeting #AH-1807

NPL 2

3GPP TR 38.889 V1.0.0, "Study on NR-based Access to Unlicensed Spectrum (Release 16)", 2018 November

SUMMARY OF INVENTION

Not enough studies have been carried out, however, on a random access method in NR.

One non-limiting and exemplary embodiment facilitates providing a transmission apparatus, a reception apparatus, a transmission method, and a reception method each capable of appropriately performing random access processing.

A transmission apparatus according to an embodiment of the present disclosure includes: transmission circuitry, which, in operation, transmits a random access signal including at least a data part; and control circuitry, which, in operation, controls a configuration of the data part based on a parameter relating to transmission of the random access signal.

It should be noted that general or specific embodiments may be implemented as a system, an apparatus, a method, an integrated circuit, a computer program, a storage medium, or any selective combination thereof.

According to an embodiment of the present disclosure, it is possible to appropriately perform random access processing.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 11 illustrates an exemplary RACH configuration table according to Embodiment 2;

FIG. 12 illustrates another exemplary RACH configuration table according to Embodiment 2;

FIG. 13 illustrates still another exemplary RACH configuration table according to Embodiment 2;

FIG. 14 illustrates still another exemplary RACH configuration table according to Embodiment 2;

FIG. 15 illustrates still another exemplary RACH configuration table according to Embodiment 2;

FIG. 24 illustrates an exemplary RACH configuration table according to Embodiment 4;

FIG. 25 illustrates another exemplary RACH configuration table according to Embodiment 4;

FIG. 26 illustrates still another exemplary RACH configuration table according to Embodiment 4; and FIG. 27 illustrates an exemplary RACH configuration table according to another embodiment.

DESCRIPTION OF EMBODIMENTS

Hereinafter, a detailed description will be given of embodiments of the present disclosure with reference to the accompanying drawings.

[Random Access Procedure]

The random access procedure includes two procedures (or types; hereinafter referred to as "RACH types") of Contention Based Random Access (CBRA) and Contention Free Random Access (CFRA), for example.

[CBRA]

Figure 1:
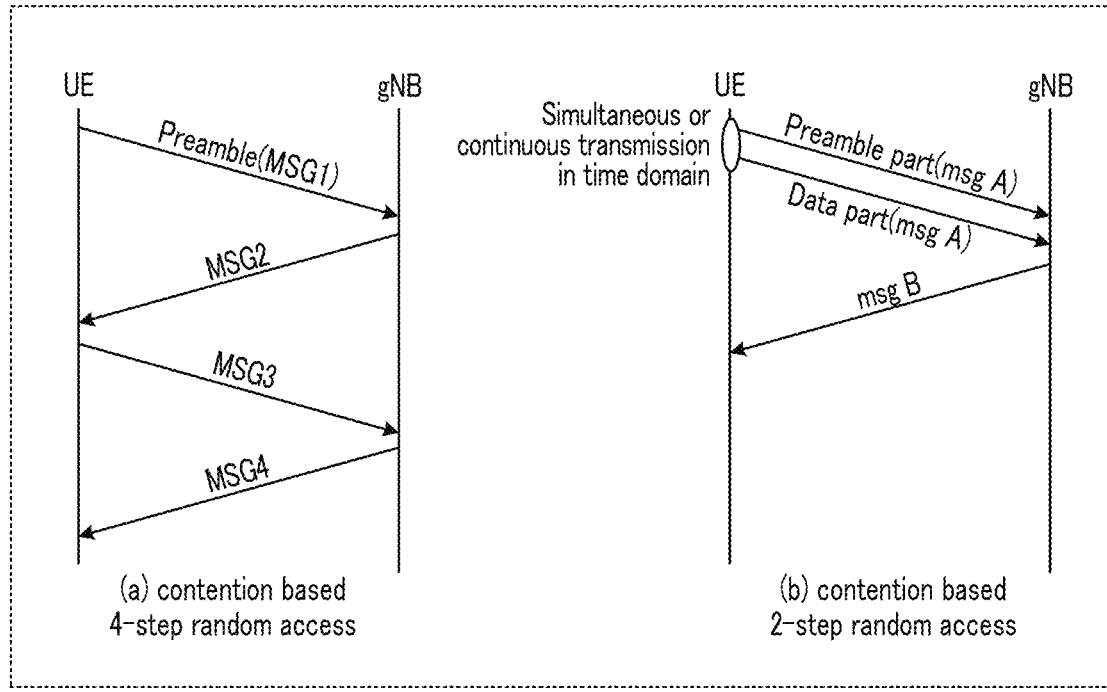
FIG. 1 illustrates an exemplary CBRA random access procedure.

An exemplary 4-step CBRA random access (also referred to as 4-step CBRA) is illustrated in (a) of FIG. 1.

A terminal (also referred to as User Equipment (UE)) transmits a Preamble to a base station (referred to as gNB, for example) in the first transmission (MSG 1) as illustrated in (a) of FIG. 1. After receiving and decoding MSG 1, the base station indicates a response to the Preamble (also referred to as RA response, for example), scheduling information including the uplink transmission timing of MSG 3, and the like, to the terminal in the second transmission (MSG 2). After receiving and decoding MSG 2, the terminal indicates information to be used for Connection establishment (or also referred to as Radio Resource Control (RRC)) connection) of information on the terminal (e.g., a terminal ID), using the scheduling information indicated by MSG 2, to the base station in the third transmission (MSG 3). Lastly, the base station indicates a connection establishment response, for example, to the terminal in the fourth transmission (MSG 4).

An exemplary 2-step CBRA random access (also referred to as 2-step CBRA) is illustrated in (b) of FIG. 1.

A terminal (UE) transmits a Preamble part (corresponding to the Preamble or MSG 1 in (a) of FIG. 1, for example) and a Data part (corresponding to MSG 3 in (a) of FIG. 1, for example) to a base station (gNB) in the first transmission (referred to as "msg A", for example) as illustrated in (b) of FIG. 1. The terminal may transmit the Preamble part and the Data part as msg A simultaneously, continuously, or within a specified time (e.g., within one slot).

Next, after receiving and decoding msg A, the base station indicates an uplink transmission timing and a connection establishment response (corresponding to MSG 2 and MSG 4 in (a) of FIG. 1), for example, to the terminal in the second transmission (hereinafter, referred to as "msg B"), as illustrated in (b) of FIG. 1.

The introduction of the 2-step random access as illustrated in (b) of FIG. 1 to NR is expected to reduce a delay time of random access in services for Ultra-Reliable and Low Latency Communications (URLLC), for example.

Note that the method in which the terminal transmits the Preamble part and the Data part simultaneously, continuously, or within a specified time as transmission of msg A in the 2-step random access can be applied to CFRA to be described later.

[CFRA]

Figure 2:
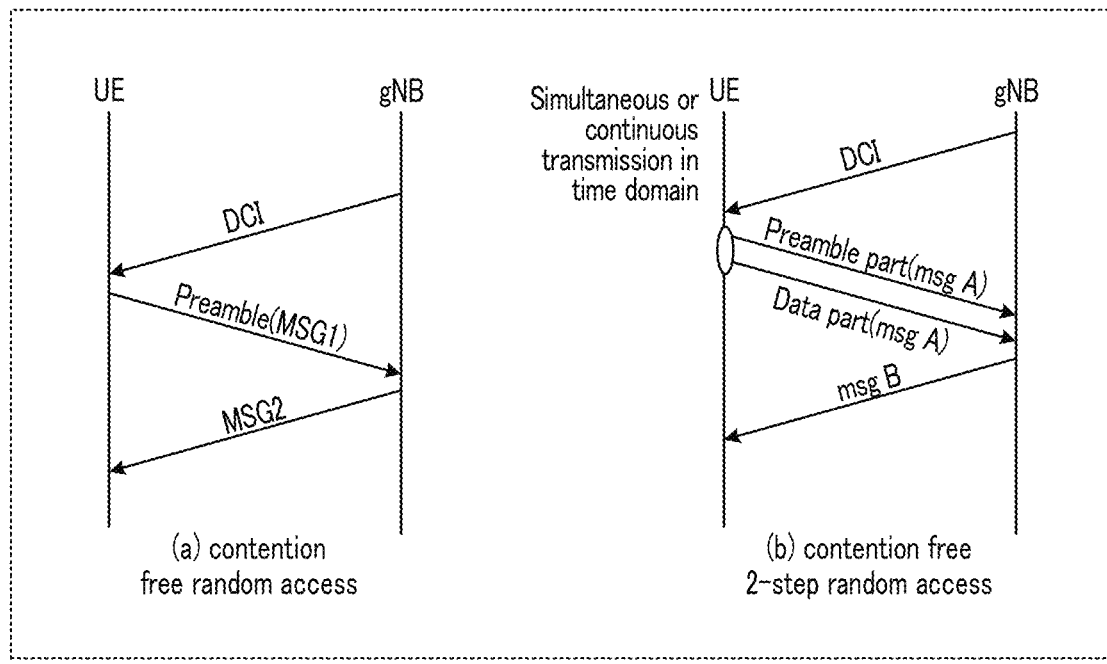
FIG. 2 illustrates an exemplary CFRA random access procedure.

An example of CFRA is illustrated in (a) of FIG. 2.

As illustrated in (a) of FIG. 2, the first Preamble transmission (MSG 1) of a terminal is triggered by, for example, Downlink Control Information (DCI) from a base station. The terminal transmits MSG 1 to the base station based on the DCI from the base station. After receiving and decoding MSG 1, the base station indicates information on an uplink transmission timing, and the like, to the terminal in the second transmission (MSG 2).

An exemplary 2-step CFRA random access (also referred to as 2-step CFRA) is illustrated in (b) of FIG. 2.

As illustrated in (b) of FIG. 2, when the first transmission (msg A) is triggered by DCI from the base station, the terminal transmits a Preamble part and a Data part simultaneously, continuously, or within a specified time (e.g., one slot) to the base station in the first transmission (msg A), as is the case with CBRA (see, for example, (b) of FIG. 1). After receiving and decoding msg A, the base station indicates an uplink transmission timing, and the like, to the terminal in the second transmission (msg B).

Note that the introduction of the 2-step random access described above is not limited to licensed bands. In NR, for example, the operation of a Physical Random Access Channel (PRACH) in unlicensed bands is also assumed as with License Assisted Access (LAA). The introduction of the 2-step random access to the unlicensed bands is expected to bring an effect of reducing Listen Before Talk (LBT) processing, for example.

[PRACH]

A PRACH (e.g., MSG 1 in (a) of FIG. 1 and (a) of FIG. 2) is constituted of a Cyclic Prefix (CP), a Preamble, and a Guard Period (GP). The Preamble is generated from, for example, a code sequence having a proper correlation characteristic (e.g., a Cyclic shifted Zadoff-Chu (CS-ZC) sequence) and the like. The CP is a signal obtained by copying a part of the Preamble, and the GP is a non-transmission section. Note that the Preamble is not limited to the CS-ZC sequence, and may be any code sequence having a proper correlation characteristic.

The information on PRACH is indicated to the terminal as, for example, cell information of the base station. Different CS-ZC sequences are uniquely associated with respective Preamble numbers, for example. In CBRA, for example, the terminal transmits a CS-ZC sequence corresponding to the randomly selected Preamble number from a plurality of Preamble numbers (referred to as a "Preamble number group", for example) as a Preamble. Meanwhile, in CFRA, for example, the terminal transmits a CS-ZC sequence corresponding to the Preamble number indicated by DCI from the base station as a Preamble.

Even in a case where a plurality of terminals use the same time resource and frequency resource to transmit the PRACH, for example, the base station can simultaneously detect a plurality of Preamble numbers (in other words, Preambles of the plurality of terminals) by detecting correlation of the CS-ZC sequences when the plurality of terminals respectively select different Preamble numbers.

The time resource and the frequency resource for PRACH are indicated to the terminal, for example, using higher layer signaling (may be referred to as RRC signaling or higher layer parameter). In addition, a plurality of time resources and frequency resources are indicated to the terminal in some cases. In such a case, in CBRA, the terminal selects a resource to use for PRACH from the plurality of indicated resources based on a specified condition.

The random access procedure has been described, thus far.

Incidentally, details of a frame format of the Data part included in msg A in the 2-step random access have not been fully discussed in NR. A configuration of a reference signal of the Data part in msg A (e.g., Demodulation Reference Signal (DMRS)) and multi-layer transmission, in particular, have not been fully discussed.

Thus, descriptions will be given hereinafter of a configuration method for a configuration of a Data part (i.e., a frame format) when a terminal transmits PRACH in 2-step random access.

Note that the "2-step random access" in the following description means a random access procedure where a Preamble part, which corresponds to MSG 1 of the 4-step random access, and a Data part, which corresponds to MSG 3 of the 4-step random access, are transmitted simultaneously, transmitted in consecutive radio resources, or transmitted in radio resources within a specified time (e.g., within a slot). In other words, the 2-step random access means a random access procedure where the Data part is transmitted with the Preamble part. Alternatively, the 2-step random access means a random access procedure where the terminal transmits the Data part before receiving a response to the Preamble, which corresponds to MSG 2 of the 4-step random access, or the terminal transmits the Data part without waiting for a response to the Preamble.

Embodiment 1

Transmission diversity is possibly applied to a Data part, for example, in order to improve the reception quality of the Data part in msg 1 of 2-step random access. The transmission diversity includes, for example, Space Frequency Block Coding (SFBC), random precoding, or the like.

Further, a terminal possibly performs Multiple Input Multiple Output (MIMO) transmission of data of the Data part using a plurality of layers (or ranks) to transmit as much information as possible in the Data part. In this case, a base station needs a Demodulation Reference Signal (DMRS) for each of a plurality of antenna ports to demodulate the Data part signal. The DMRS for each antenna port is required to be transmitted, for example, using an orthogonal resource (e.g., a frequency, time, and code resource).

Herein, the base station cannot determine the terminal from which msg A has been transmitted unless the base station demodulates the Data part in msg A in the CBRA 2-step random access. Some terminals support only one antenna depending on the performance of the terminal (e.g., UE capability). Thus, the base station cannot instruct all of the terminals to perform transmission using a plurality of antenna ports in CBRA.

In the CFRA 2-step random access, in contrast, the base station indicates a Preamble number to use for the transmission of msg A in instructing the transmission of msg A to the terminal. Thus, the base station can identify the terminal that has transmitted msg A (e.g., PRACH) from the detected Preamble number in Preamble detection processing. This enables the base station to instruct each terminal to perform transmission using a single antenna port or a plurality of antenna ports.

In this regard, the number of ranks (also referred to as the rank value or the number of layers) of the Data part is configured according to the type of random access procedure (the RACH Type) such as CBRA and CFRA in the present embodiment.

[Overview of Communication System]

A communication system according to an embodiment of the present disclosure includes terminal 100 and base station 200. In the following description, terminal 100, which corresponds to a transmission apparatus, transmits PRACH, and base station 200, which corresponds to a reception apparatus, receives the PRACH, as an example.

Figure 3:
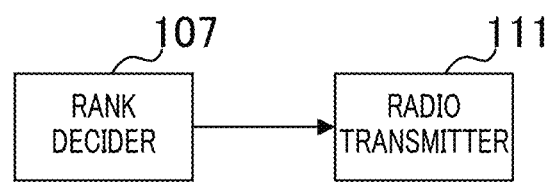
FIG. 3 is a block diagram illustrating a configuration of a part of a terminal according to Embodiment 1.

FIG. 3 is a block diagram illustrating a configuration of a part of terminal 100 according to the present embodiment. In terminal 100 illustrated in FIG. 3, radio transmitter 111 (corresponding to transmission circuitry, for example) transmits a random access signal (e.g., PRACH) including at least a data section (e.g., a Data part). Rank decider 107 (corresponding to control circuitry, for example) controls a configuration (e.g., the number of ranks) of the data section based on a parameter (e.g., a RACH type) relating to the transmission of the random access signal.

Figure 4:
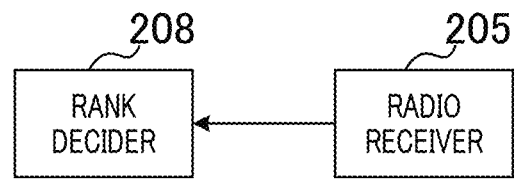
FIG. 4 is a block diagram illustrating a configuration of a part of a base station according to Embodiment 1.

FIG. 4 is a block diagram illustrating a configuration of a part of base station 200 according to the present embodiment. In base station 200 illustrated in FIG. 4, radio receiver 205 (corresponding to reception circuitry, for example) receives a random access signal (e.g., PRACH) including at least a data section (e.g., a Data part). Rank decider 208 controls a configuration (e.g., the number of ranks) of the data section based on a parameter relating to the transmission of the random access signal.

[Configuration of Terminal]

Figure 5:
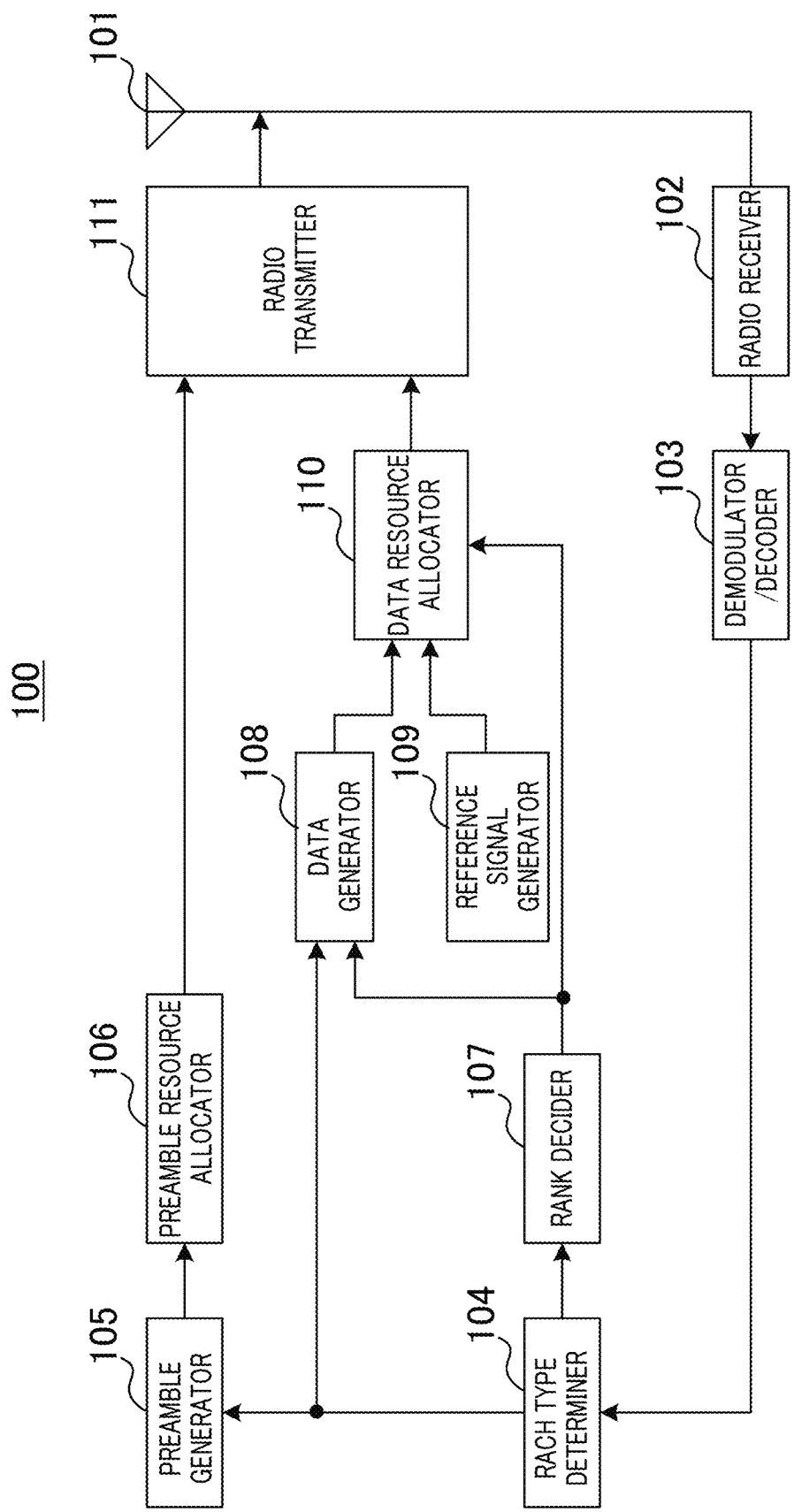
FIG. 5 is a block diagram illustrating a configuration of the terminal according to Embodiment 1.

FIG. 5 is a block diagram illustrating a configuration of terminal 100 according to the present embodiment.

In FIG. 5, terminal 100 includes antenna 101, radio receiver 102, demodulator/decoder 103, RACH type determiner 104, Preamble generator 105, Preamble resource allocator 106, rank decider 107, Data generator 108, reference signal generator 109, Data resource allocator 110, and radio transmitter 111.

Radio receiver 102 performs reception processing such as down-conversion and A/D conversion to the received signal received from base station 200 via antenna 101, and outputs the received signal obtained by the reception processing to demodulator/decoder 103.

The received signal received from base station 200 may include, for example, a signal of random access (e.g., msg B illustrated in (b) of FIG. 1 or (b) of FIG. 2), higher layer signaling, down link control information (e.g., DCI), or the like.

Demodulator/decoder 103 demodulates and decodes the received signal to be inputted from radio receiver 102. Demodulator/decoder 103 outputs the demodulated signal (e.g., downlink control information) to RACH type determiner 104.

RACH type determiner 104 determines a type of random access procedure (a RACH type) based on the downlink control information to be inputted from demodulator/decoder 103.

For example, RACH type determiner 104 determines the RACH type as "CFRA" when the random access (PRACH) transmission is indicated by the downlink control information. RACH type determiner 104, for example, may determine the RACH type as CFRA when Cyclic Redundancy Check (CRC) of DCI format 1_0 in NR is scrambled using a Cell-Radio Network Temporary Identifier (C-RNTI), and when "Frequency domain resource assignment" field is all 1, in the downlink control information.

In contrast, RACH type determiner 104 determines the RACH type as "CBRA" when the random access transmission is not indicated by the downlink control information, for example. RACH type determiner 104, for example, may determine the RACH type as CBRA when PRACH (i.e., the random access signal) is transmitted at the initiative of terminal 100 in the 2-step random access.

RACH type determiner 104 outputs RACH type information indicating the determined RACH Type (e.g., either one of CBRA or CFRA) to Preamble generator 105, rank decider 107, and Data generator 108.

Preamble generator 105 randomly selects a single Preamble number from a Preamble number group, for example, when the RACH type indicated in the RACH type information to be inputted from RACH type determiner 104 is CBRA. Meanwhile, Preamble generator 105 selects a Preamble number indicated by the downlink control information, for example, when the RACH type indicated in the RACH type information is CFRA. Preamble generator 105, for example, generates a CS-ZC sequence using the sequence number and the cyclic shift value (the CS value) corresponding to the selected Preamble number, and outputs the generated CS-ZC sequence to Preamble resource allocator 106 as a Preamble part signal (or a preamble signal). Herein, Preamble generator 105 generates different code sequences (e.g. CS-ZC sequences) that are orthogonal or less correlated when the Preamble numbers selected are different.

Preamble resource allocator 106 allocates, for example, at least one frequency resource indicated by the higher layer signaling for the Preamble part signal to be inputted from Preamble generator 105. In addition, Preamble resource allocator 106 outputs the Preamble part signal to radio transmitter 111 based on the configured transmission timing.

Rank decider 107 decides the rank (or the number of layers) of the Data part based on the RACH type (e.g., CBRA or CFRA) indicated in the RACH type information to be inputted from RACH type determiner 104. Rank decider 107 outputs rank information indicating the decided rank to Data generator 108 and Data resource allocator 110. Note that examples of the rank deciding method in rank decider 107 will be described later.

Data generator 108 generates a data signal (a Data part signal) based on the RACH type information to be inputted from RACH type determiner 104 and the rank information to be inputted from rank decider 107. In the case of CBRA, for example, Data generator 108 generates a data signal (corresponding to MSG 3 in the 4-step random access, for example) including, for example, information to be used for connection establishment, such as a terminal ID. Additionally, in the case of CFRA, for example, Data generator 108 generates a data signal including, for example, a Beam Failure Report (BFR) or a Handover completion message. Further, Data generator 108 controls, for example, transmission diversity or precoding based on the rank indicated in the rank information. Data generator 108 then encodes and modulates the generated data signal, and outputs the modulated signal (a data sequence) to Data resource allocator 110.

Reference signal generator 109 generates a reference signal for data demodulation (e.g., a DMRS), controls precoding and the like, and outputs the reference signal to Data resource allocator 110, for example. The reference signal may be generated from, for example, a PN sequence, a CS-ZC sequence, or the like. Note that terminal 100 does not have to generate the reference signal when the Preamble can be used for channel estimation in reception processing in base station 200, for example.

Data resource allocator 110, for example, allocates the frequency resource indicated by the higher layer signaling or the downlink control information for the Data part signal to be inputted from Data generator 108. In addition, Data resource allocator 110 calculates the number of antenna ports based on the rank indicated in the rank information to be inputted from rank decider 107. Data resource allocator 110 then allocates the time, frequency or code resources corresponding to the antenna ports of the calculated number of the antenna ports for the reference signal to be inputted from reference signal generator 109. Data resource allocator 110 also outputs the Data part signal and the reference signal to radio transmitter 111 based on the configured transmission timing.

Radio transmitter 111 performs transmission processing such as D/A conversion and up-conversion on the Preamble part signal to be inputted from Preamble resource allocator 106, the Data part signal to be inputted from Data resource allocator 110, and the reference signal. Radio transmitter 111 transmits a radio signal, which corresponds to PRACH (or msg A) in the 2-step random access, for example (see (b) of FIG. 1 or (b) of FIG. 2), obtained by the transmission processing to base station 200 via antenna 101.

[Configuration of Base Station]

Figure 6:
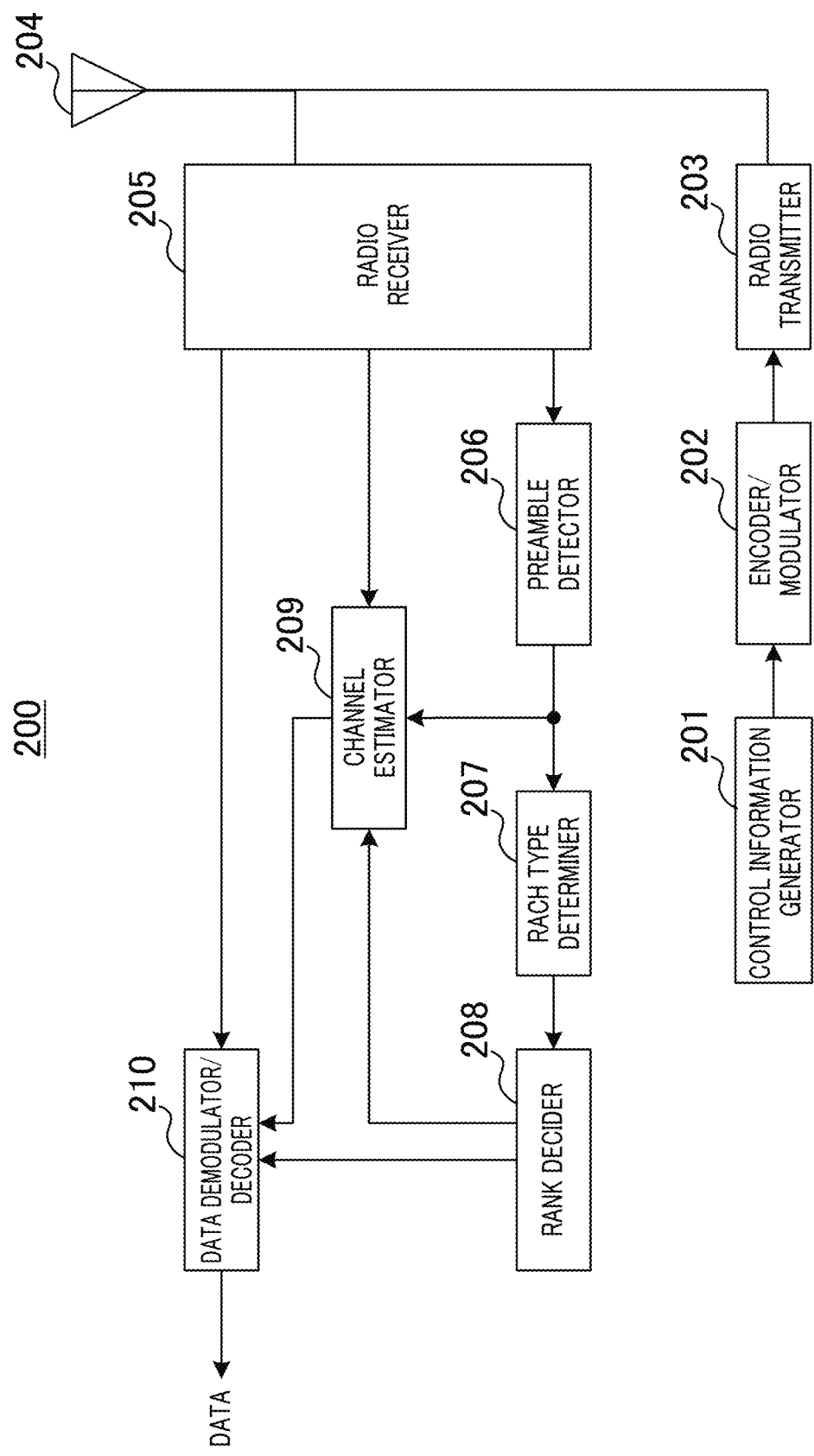
FIG. 6 is a block diagram illustrating a configuration of the base station according to Embodiment 1.

FIG. 6 is a block diagram illustrating a configuration of base station 200 according to the present embodiment.

In FIG. 6, base station 200 includes control information generator 201, encoder/modulator 202, radio transmitter 203, antenna 204, radio receiver 205, Preamble detector 206, RACH type determiner 207, rank decider 208, channel estimator 209, and Data demodulator/decoder 210.

Control information generator 201, for example, generates control information to be used by terminal 100 for random access transmission, and outputs the generated control information to encoder/modulator 202. The control information may include, for example, higher layer signaling such as RACH-Configuration in NR (e.g., RACH-ConfigCommon and RACH-ConfigDedicated), and downlink control information for triggering CFRA, such as DCI format 1_0 in NR.

In addition, the downlink control information may include, for example, the rank to be used for the Data part in msg A of the 2-step random access, the number of antenna ports for the reference signal, a transmission diversity method, a precoding method, a preamble number for the Preamble part, an allocation resource for the Preamble part, or the like.

Note that all the control information do not have to be simultaneously indicated to terminal 100. A part of the control information may be indicated to terminal 100 as cell common information, quasi-static indication information, or dynamic indication information (e.g., DCI). In addition, a part of the control information may be specified as system common information, and does not have to be indicated from base station 200 to terminal 100, for example.

Encoder/modulator 202 modulates and encodes the control information to be inputted from control information generator 201, and outputs the modulated signal to radio transmitter 203.

Radio transmitter 203 performs transmission processing such as D/A conversion, up-conversion, and amplification on the signal to be inputted from encoder/modulator 202, and outputs a radio signal obtained by the transmission processing to terminal 100 via antenna 204.

Radio receiver 205 performs reception processing such as down-conversion and A/D conversion to the PRACH signal received from terminal 100 via antenna 204 (e.g., msg A in the 2-step random access), for example, in PRACH transmission resources available in a cell of base station 200. Radio receiver 205 outputs a signal obtained by the reception processing to Preamble detector 206, channel estimator 209, and Data demodulator/decoder 210.

Preamble detector 206 generates a replica signal for detecting a preamble part signal using the sequence number and the CS number corresponding to each Preamble number of a Preamble group available in the cell of base station 200. Preamble detector 206 performs correlation processing between the generated replica signal and the signal to be inputted from radio receiver 205 (e.g., msg A), detects the PRACH preamble, and estimates the timing. Preamble detector 206 outputs, for example, the detected Preamble number to RACH type determiner 207 and channel estimator 209.

Note that the correlation processing in Preamble detector 206 may be calculation processing of a delay profile used in the timing estimation by performing the correlation processing in a time domain, or may be calculation processing of a delay profile by performing the correlation processing (division processing) in a frequency domain and performing Inverse Fast Fourier Transform (IFFT) after the correlation processing.

RACH type determiner 207 determines a RACH type of the PRACH signal (the random access signal) received from terminal 100 based on the Preamble number to be inputted from Preamble detector 206.

For example, RACH type determiner 207 determines whether the detected Preamble number is the Preamble number for CFRA indicated to terminal 100 by the downlink control information. RACH type determiner 207 determines the RACH type of the received PRACH signal as "CFRA" when the Preamble number is the Preamble number for CFRA. RACH type determiner 207 determines, however, the RACH type of the received PRACH signal as "CBRA" when the Preamble number is not the Preamble number for CFRA. RACH type determiner 104 outputs RACH type information indicating the determined RACH Type (e.g., either one of CBRA or CFRA) to rank decider 208.

Rank decider 208 decides the rank (or the number of layers) of the Data part based on the RACH Type (e.g., CBRA or CFRA) indicated in the RACH type information to be inputted from RACH type determiner 207. Rank decider 208 outputs rank information indicating the decided rank to channel estimator 209 and Data demodulator/decoder 210. Note that examples of the rank deciding method in rank decider 208 will be described later.

Channel estimator 209 calculates the number of antenna ports based on the rank indicated in the rank information to be inputted from rank decider 208. Channel estimator 209 performs correlation processing (e.g., division processing) using a replica reference signal in the frequency domain on the reference signal assigned to the time, frequency or code resource corresponding to each antenna port of the calculated number of the antenna ports, and calculates a channel estimate of each antenna port. Channel estimator 209 outputs the calculated channel estimate to Data demodulator/decoder 210.

Data demodulator/decoder 210 performs demodulation and decoding processing on the Data part signal included in the received signal to be inputted from radio receiver 205 based on the channel estimate to be inputted from channel estimator 209 and the rank indicated in the rank information to be inputted from rank decider 208, and outputs the data (e.g., the Data part signal in msg A) as the decoding result.

[Operations of Terminal 100 and Base Station 200]

Operation examples of terminal 100 and base station 200 including the above-described configurations will be described.

Figure 7:
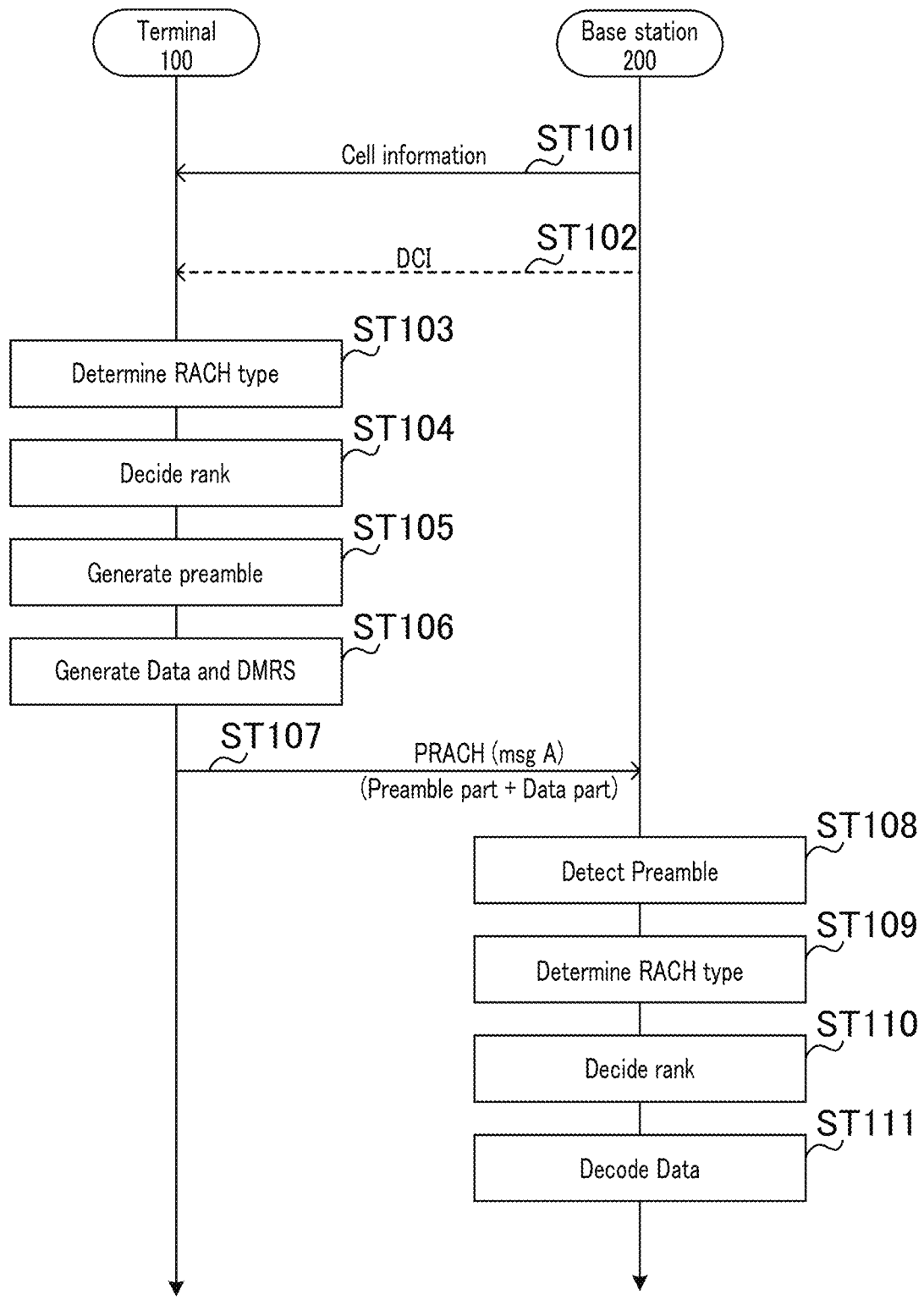
FIG. 7 is a sequence diagram illustrating exemplary operations of the terminal and the base station according to Embodiment 1.

FIG. 7 is a sequence diagram illustrating exemplary operations of terminal 100 (FIG. 5) and base station 200 (FIG. 6).

In FIG. 7, base station 200 indicates (i.e., broadcasts) cell information including control information to be used by terminal 100 for PRACH transmission to terminal 100 (ST101). The cell information may include, for example, higher layer signaling including RACH-Configuration in NR such as RACH-ConfigCommon, and RACH-ConfigDedicated.

Base station 200 transmits downlink control information (e.g., DCI) to terminal 100 (ST102) in the case of triggering the PRACH transmission of terminal 100 (e.g., in the case of CFRA). Base station 200 does not have to transmit the DCI in the case of not triggering the PRACH transmission of terminal 100 (e.g., in the case of CBRA).

Terminal 100 determines the RACH type (CBRA or CFRA) based on, for example, presence or absence of the downlink control information (DCI) (ST103). In addition, terminal 100 decides the rank based on the determined RACH type (ST104). In other words, terminal 100 decides a configuration of a Data part signal (e.g., the number of resources for a reference signal) based on the RACH type.

Terminal 100 generates a preamble part signal of msg A based on the RACH type (ST105), and generates a Data part signal of msg A (e.g., a data signal and a reference signal) based on the decided rank (ST106).

Terminal 100 transmits a PRACH signal (e.g., msg A) including the generated Preamble part signal and Data part signal to base station 200 (ST107).

Base station 200 detects the Preamble part signal and identifies the Preamble number used for the PRACH signal (ST108). Additionally, base station 200 determines the RACH type (e.g., CBRA or CFRA) based on the identified Preamble number (ST109), and decides the rank based on the determined RACH type (ST110).

Base station 200 then performs channel estimation based on the decided rank, and decodes the Data part signal using a channel estimate (ST111).

[Rank Deciding Method]

Next, descriptions will be given of exemplary rank deciding methods in rank decider 107 of terminal 100 and rank decider 208 of base station 200.

Hereinafter, rank deciding methods 1-1 and 1-2 will be each described as examples.

<Deciding Method 1-1>

In Deciding Method 1-1, terminal 100 and base station 200 decide the maximum rank of the Data part in msg A according to the RACH Type (e.g., CBRA or CFRA) of PRACH transmission.

For example, terminal 100 and base station 200 decide the maximum rank of the Data part in msg A to be "1" when the RACH type in the PRACH transmission is CBRA.

Meanwhile, terminal 100 and base station 200 decide the maximum rank of the Data part in msg A to be "X" (where X is equal to or greater than 1) when the RACH type in the PRACH transmission is CFRA.

When the RACH type is CFRA, for example, terminal 100 decides the rank to be used for the transmission of the Data part in msg A from 1 to X. For example, the value of the rank to be used by terminal 100 for the transmission of the Data part may be indicated by downlink control information (DCI) for triggering CFRA. Alternatively, the value of the rank to be used by terminal 100 for the transmission of the Data part may be the value of the rank applied to PUSCH transmission immediately preceding the PRACH transmission.

Note that the maximum rank X may be indicated from base station 200 to terminal 100 by quasi-static indication information such as higher layer signaling, may be indicated from base station 200 to terminal 100 by dynamic control information such as DCI, or may be specified, for example.

As mentioned, the rank of the Data part in msg A is fixed to 1 when the RACH type is CBRA. As described above, in the CBRA 2-step random access, base station 200 cannot determine terminal 100 from which msg A has been transmitted unless base station 200 demodulates the Data part in msg A, and cannot instruct all of the terminals to perform transmission using a plurality of antenna ports. In this regard, fixing the rank to 1 when the RACH type is CBRA enables to apply CBRA to all terminals 100 including, for example, terminals 100 that do not support transmission with a plurality of antenna ports.

Further, the rank of the Data part in msg A is selected from 1 to X when the RACH type is CFRA. As described above, in CFRA, for example, the rank of the Data part used by terminal 100 is selected from the range of 1 to X based on the downlink control information or the rank applied to the PUSCH transmission immediately preceding the PRACH transmission. This allows terminal 100 to dynamically change the rank of the Data part. For example, terminal 100 can appropriately configure (e.g., increase or decrease) the amount of transmission data in msg A in CFRA, by dynamically changing the rank according to the reception quality.

Further, in Deciding Method 1-1, fixing the rank to 1 for CBRA makes it possible to reduce the signaling amount of the control information for indicating the rank of CBRA, for example, compared with the method in which both the ranks of CBRA and CFRA are indicated from base station 200 to terminal 100.

Note that, another method may be applied in CFRA, the method providing trigger types associated with the data type (or the data amount) to be transmitted from terminal 100, and uniquely deciding the rank according to the trigger type.

<Deciding Method 1-2>

In Deciding Method 1-2, the maximum rank of the Data part in msg A is fixed regardless of the PRACH Type.

For example, terminal 100 and base station 200 decide the maximum rank of the Data part in msg A to be "1" when the RACH type of the PRACH transmission is either CBRA or CFRA. In other words, the rank of the Data part in msg A is fixed to 1 when the RACH type is either CBRA or CFRA. This enables to reduce the signaling amount for indicating the rank of the Data part in msg A from base station 200 to terminal 100. In addition, fixing the rank of the PRACH signal simplifies the control of the PRACH transmission.

The rank deciding methods according to the present embodiment have been described, thus far.

As described above, in the present embodiment, terminal 100 and base station 200 control the configuration of the Data part signal based on the RACH type, which is one of the parameters relating to the PRACH signal transmission. For example, terminal 100 and base station 200 decide the number of resources (e.g., the rank or the number of antenna ports) for the reference signal (DMRS) to demodulate the data signal of the Data part based on the RACH type.

This makes it possible to appropriately control the configuration of the reference signal (e.g., DMRS) of the Data part included in msg A and control the multi-layer transmission, for example, in the 2-step random access in NR. Thus, terminal 100 can efficiently transmit the PRACH signal in the 2-step random access according to the RACH type, for example.

Note that although the present embodiment has described the methods of deciding the "maximum rank" on the basis of the RACH type as examples, the rank deciding method according to the present embodiment may decide, instead of the maximum rank, the maximum number of antenna ports, in other words, the number of resources for the reference signal orthogonal by time, frequency or codes. The number of the antenna ports is required for at least the number of ranks. Thus, the method of deciding the maximum number of the antenna ports is similarly defined to the case of deciding the maximum rank.

Incidentally, a plurality of antenna ports may be configured even when the rank is 1. The example thereof is the case where transmission diversity (e.g., SFBC) is applied to the Data part.

Embodiment 2

In Embodiment 1, descriptions have been given of the methods of deciding the rank of the Data part in msg A according to the RACH type. In the present embodiment, in contrast, descriptions will be given of methods of deciding the rank of the Data part according to the "preamble number" or the "time and frequency resources for the preamble" of the preamble part in msg A.

[Configuration of Terminal]

Figure 8:
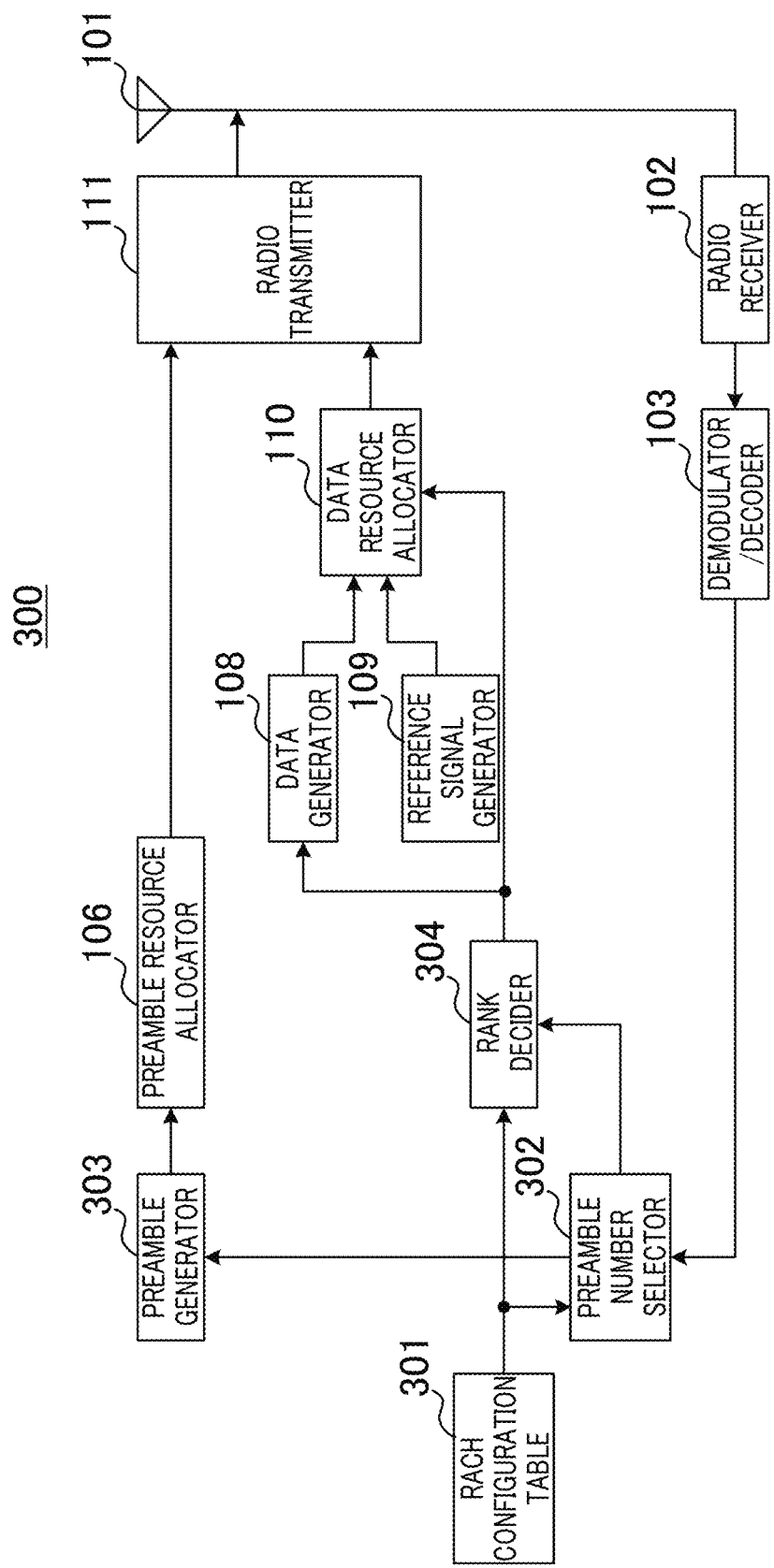
FIG. 8 is a block diagram illustrating a configuration of a terminal according to Embodiment 2.

FIG. 8 is a block diagram illustrating a configuration of terminal 300 according to the present embodiment. Note that, the same configurations as those in Embodiment 1 (FIG. 5) are denoted by the same reference signs in FIG. 8, and the descriptions thereof are omitted.

RACH configuration table 301 in terminal 300 is a table of Preamble numbers grouped according to the rank (the rank value) to be used for the Data part in msg A. The information included in RACH configuration table 301 may be indicated from base station 400 to terminal 300 by, for example, quasi-static indication information (e.g., higher layer signaling) or dynamic indication information (e.g., DCI). Alternatively, the information included in RACH configuration table 301 may be specified as system common information and does not have to be indicated from base station 400 to terminal 300.

The information included in RACH configuration table 301 is outputted to, for example, each of Preamble number selector 302 and rank decider 304. Note that examples of RACH configuration table 301 will be described later.

Preamble number selector 302 selects a Preamble number to be used for PRACH transmission. Preamble number selector 302 outputs Preamble information indicating the selected Preamble number to Preamble generator 303 and rank decider 304.

When the RACH type is CBRA, Preamble number selector 302 refers to RACH configuration table 301 and randomly selects a single Preamble number from the Preamble numbers included in the group (the Preamble number group) associated with information on terminal 300, for example. The information on terminal 300 may include, for example, at least one of the rank of the Data part, the path loss between terminal 300 and base station 400, and the information amount (e.g., the number of bits) of the Data part, and may also include other information (e.g., information on msg A or the Data part).

When the RACH type is CFRA, in contrast, Preamble number selector 302 selects the Preamble number indicated by the downlink control information to be inputted from demodulator/decoder 103.

Note that exemplary methods of selecting the Preamble number in Preamble number selector 302 will be described later.

Preamble generator 303 generates a CS-ZC sequence using the sequence number and the CS value corresponding to the Preamble number indicated in the Preamble information to be inputted from Preamble number selector 302, and outputs a signal obtained by performing precoding processing, for example, on the generated CS-ZC sequence, to Preamble resource allocator 106 as a Preamble part signal.

Rank decider 304 refers to RACH configuration table 301, decides (i.e., determines) the rank corresponding to the Preamble number indicated in the Preamble information to be inputted from Preamble number selector 302, and outputs rank information indicating the decided rank to Data generator 108 and Data resource allocator 110. Note that exemplary methods of deciding the rank in rank decider 304 will be described later.

[Configuration of Base Station]

Figure 9:
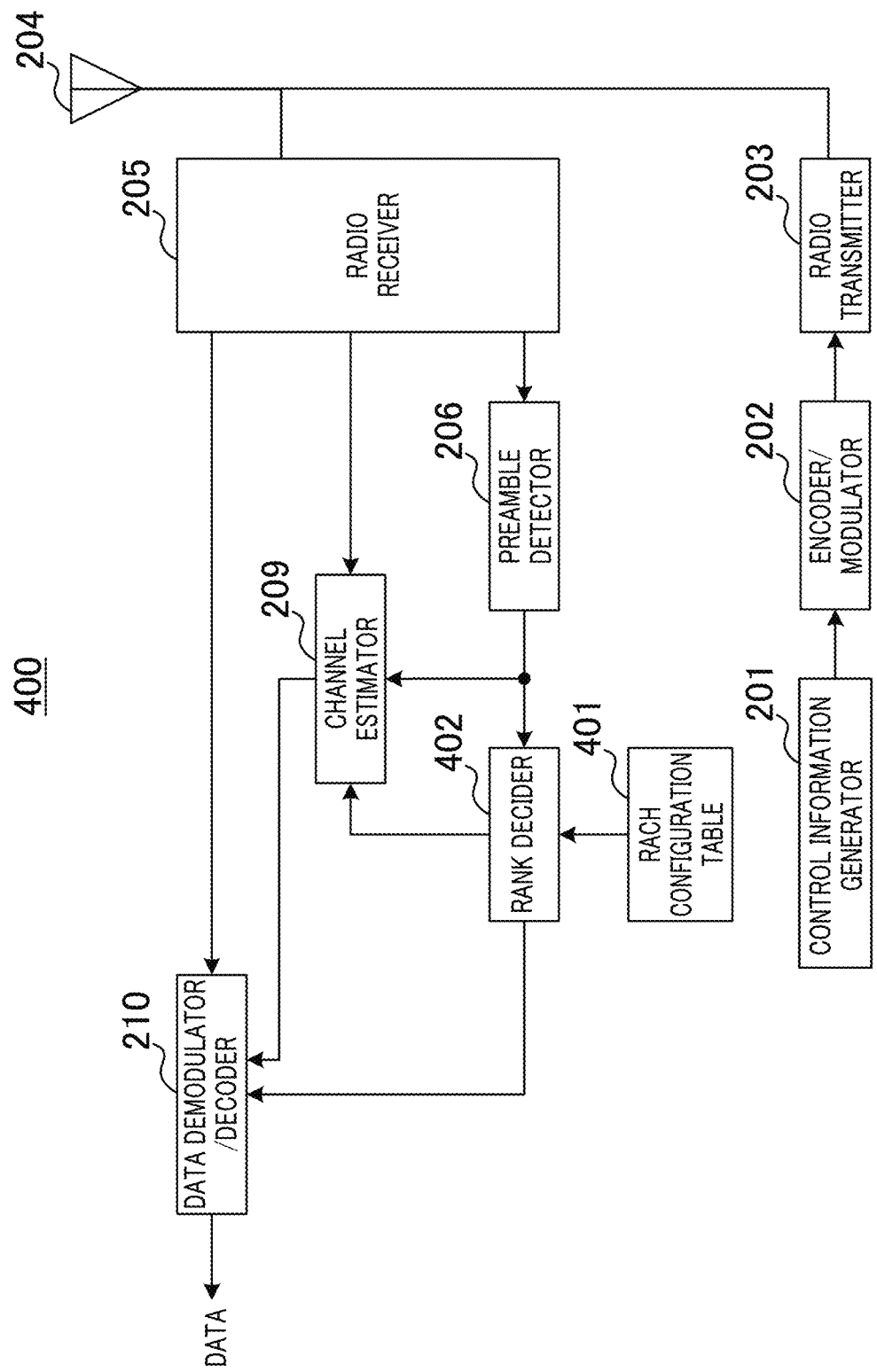
FIG. 9 is a block diagram illustrating a configuration of a base station according to Embodiment 2.

FIG. 9 is a block diagram illustrating a configuration of base station 400 according to the present embodiment. Note that, the same configurations as those in Embodiment 1 (FIG. 6) are denoted by the same reference signs in FIG. 9, and the descriptions thereof are omitted. RACH configuration table 401 in base station 400 is a table of Preamble numbers grouped according to the rank (the rank value) to be used for the Data part in msg A, as with RACH configuration table 301 included in terminal 300. The information included in RACH configuration table 401 is outputted to, for example, rank decider 402. Note that examples of RACH configuration table 401 will be described later.

Rank decider 402 refers to RACH configuration table 401, and decides (i.e., determines) the rank corresponding to the Preamble number to be inputted from Preamble detector 206, as with rank decider 304 of terminal 300. Rank decider 402 outputs rank information indicating the decided rank to channel estimator 209 and Data demodulator/decoder 210. Note that exemplary methods of deciding the rank in rank decider 402 will be described later.

[Operations of Terminal 300 and Base Station 400]

Operation examples of terminal 300 and base station 400 including the above-described configurations will be described.

Figure 10:
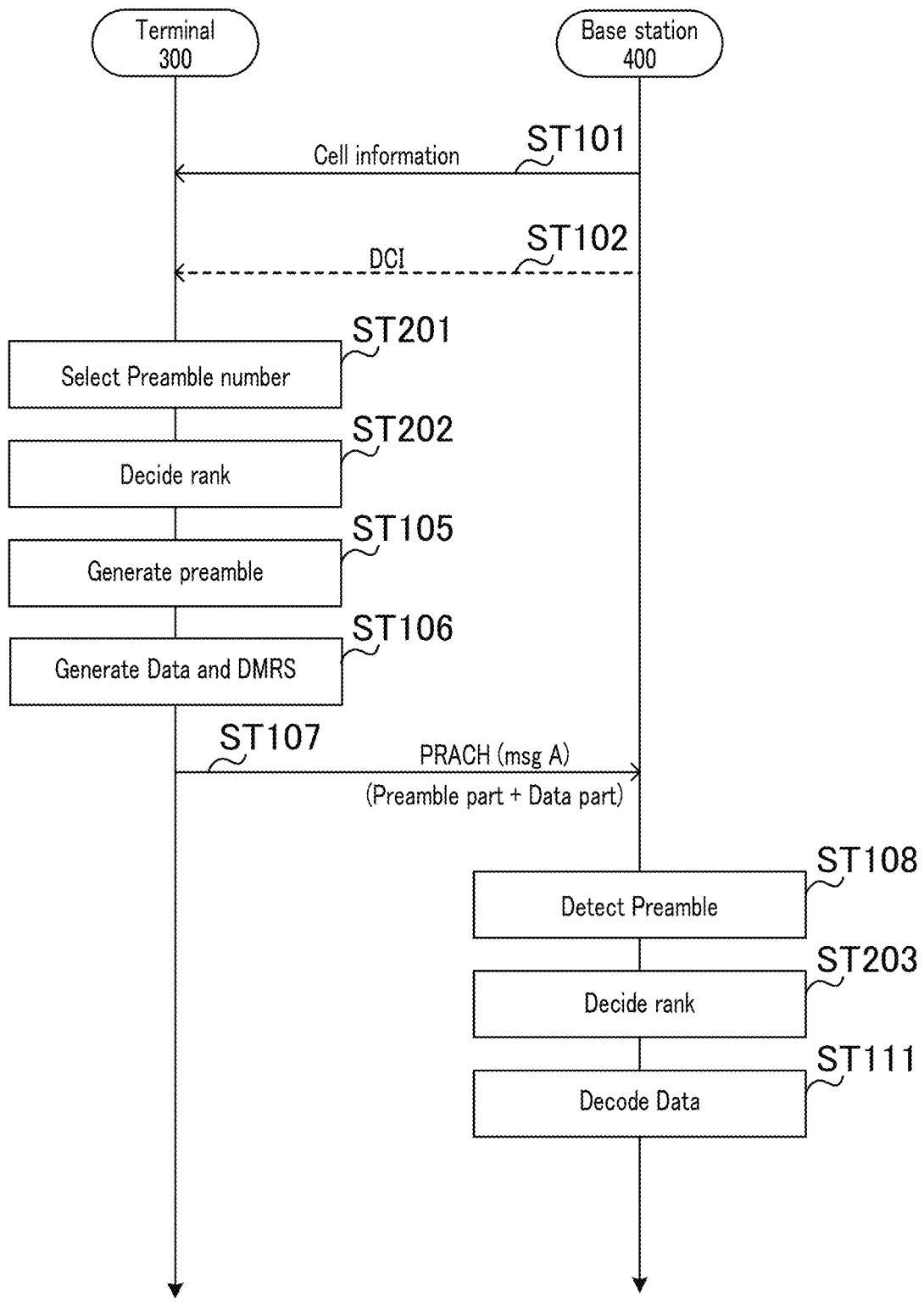
FIG. 10 is a sequence diagram illustrating exemplary operations of the terminal and the base station according to Embodiment 2.

FIG. 10 is a sequence diagram illustrating exemplary operations of terminal 300 (FIG. 8) and base station 400 (FIG. 9). Note that, the same operations as those in Embodiment 1 (see, for example, FIG. 7) are denoted by the same reference signs in FIG. 10, and the descriptions thereof are omitted.

In FIG. 10, terminal 300 refers to RACH configuration table 301, for example, and randomly selects a single Preamble number from the Preamble number group corresponding to the information on terminal 300 (examples thereof will be described later) (ST201). Terminal 300 also selects the rank corresponding to the selected Preamble number referring to RACH configuration table 301 (ST202).

Meanwhile, base station 400 refers to RACH configuration table 401, and decides the rank corresponding to the Preamble number used for the PRACH signal (i.e., the detected Preamble number) (ST203).

[Rank Deciding Method]

Next, descriptions will be given of exemplary rank deciding methods in terminal 300 and base station 400.

Hereinafter, rank deciding methods 2-1, 2-2, and 2-3 will be each described as examples.

<Deciding Method 2-1>

As illustrated in FIG. 11, RACH configuration tables 301 and 401 according to Deciding Method 2-1 are, for example, tables in which Preamble numbers for the Preamble part in msg A and ranks to be applied to the Data part in msg A are associated with each other.

For example, Preamble number selector 302 of terminal 300 selects the rank of the Data part in msg A using at least one of the following information on terminal 300 in CBRA.

(1) Reception quality (e.g., path loss)
(2) Data amount of the Data part in msg A (e.g., the number of bits)
(3) UE Capability (e.g., the number of transmission antennas)
(4) The rank applied to PUSCH transmission immediately preceding the PRACH transmission Preamble number selector 302 then refers to RACH configuration table 301 illustrated in FIG. 11, for example, and randomly selects a single Preamble number from the Preamble numbers included in the group corresponding to the selected rank.

When the selected rank is 1, for example, Preamble number selector 302 selects a single Preamble number from Preamble numbers 0 to 2 included in Group A illustrated in FIG. 11. Similarly, when the selected rank is 2, for example, Preamble number selector 302 selects a single Preamble number from Preamble numbers 3 and 4 included in Group B illustrated in FIG. 11.

Meanwhile, in the case of CFRA, for example, Preamble number selector 302 selects the Preamble number included in the DCI to be indicated from base station 400.

Rank decider 304 of terminal 300 refers to RACH configuration table 301, and decides (or determines) the rank of the Data part corresponding to the Preamble number selected in Preamble number selector 302. As an example, when Preamble number 3 is selected in Preamble number selector 302 in FIG. 11, rank decider 304 decides the rank of the Data part in msg A to be 2. The same applies when another Preamble number is selected in Preamble number selector 302.

Note that the rank of the Data part is selected when the Preamble number is selected in Preamble number selector 302 in Deciding Method 2-1, and thus rank decider 304 may use the rank selected in Preamble number selector 302 as it is.

Incidentally, rank decider 402 of base station 400 refers to RACH configuration table 401, and decides (or determines) the rank of the Data part corresponding to the Preamble number detected in Preamble detector 206. As an example, when Preamble number 3 is detected in Preamble detector 206 in FIG. 11, rank decider 402 decides the rank of the Data part in msg A to be 2. The same applies when another Preamble number is detected in Preamble detector 206.

As described above, the Preamble numbers for the Preamble part in msg A and the ranks applied to the Data part in msg A are associated with each other in Deciding Method 2-1. This enables terminal 300 to decide the rank according to the Preamble number, thereby eliminating the need for the control information to indicate the rank from base station 400 to terminal 300 and reducing the signaling amount.

Further, in Deciding Method 2-1, base station 400 can recognize the rank of the Data part in msg A selected in terminal 300 in detecting the Preamble. In other words, base station 400 can recognize the rank of the Data part before decoding the Data part in msg A. Thus, in Deciding Method 2-1, one or more ranks can be applied to the Data part in msg A in CBRA as well as in CFRA, thereby increasing the information amount that can be transmitted in the Data part in msg A.

Note that the table illustrated in FIG. 11 is an example, and the association between the Preamble numbers and the ranks is not limited to the association illustrated in FIG. 11.

<Deciding Method 2-2>

As illustrated in FIG. 12, RACH configuration tables 301 and 401 according to Deciding Method 2-2 are, for example, tables in which Preamble numbers for the Preamble part in msg A, ranks to be applied to the Data part in msg A, and the path loss level measured from a downlink channel are associated with each other.

The path loss to be measured from the downlink channel may be measured by using, for example, a synchronization signal.

As illustrated in FIG. 12, a lower rank is configured for groups with larger path loss.

Note that the determination criteria of the path loss (criteria for determining whether the path loss is large or small, e.g., a threshold) may be, for example, specified or indicated by quasi-static indication information such as higher layer signaling, or dynamic indication information such as DCI.

In CBRA, Preamble number selector 302, for example, refers to RACH configuration table 301 illustrated in FIG. 12, and randomly selects a single Preamble number from the Preamble numbers included in the group corresponding to the path loss level measured from the downlink channel. When the path loss is "large", for example, Preamble number selector 302 selects a single Preamble number from Preamble numbers 0 to 2 included in Group A illustrated in FIG. 12. Similarly, when the path loss is "small", for example, Preamble number selector 302 selects a single Preamble number from Preamble numbers 3 and 4 included in Group B illustrated in FIG. 12.

Meanwhile, in the case of CFRA, for example, Preamble number selector 302 selects the Preamble number included in the DCI indicated from base station 400.

Note that the operations of rank decider 304 of terminal 300 and rank decider 402 of base station 400 are the same as those in Deciding Method 2-1, and the descriptions thereof are thus omitted.

As described above, the Preamble numbers for the Preamble part in msg A, the ranks applied to the Data part in msg A, and the path loss are associated with each other in Deciding Method 2-2. This enables terminal 300 to decide the rank according to the path loss, thereby eliminating the need for the control information to indicate the rank from base station 400 to terminal 300 and reducing the signaling amount.

Additionally, terminal 300 can easily select the rank according to the path loss in Deciding Method 2-2, thereby simplifying the implementation of terminal 300.

Further, in Deciding Method 2-2, base station 400 can recognize the rank of the Data part in msg A selected in terminal 300 in detecting the Preamble, as in Deciding Method 2-1, and thus one or more ranks can be applied to the Data part in msg A in CBRA as well, thereby increasing the information amount that can be transmitted in the Data part in msg A.

Note that although Deciding Method 2-2 has described the case where the path loss and the rank are associated with each other, the parameter to be associated with the rank is not limited to the path loss, and may be, for example, any parameters highly related with the rank (e.g., a parameter relating to the reception quality).

Note that the table illustrated in FIG. 12 is an example, and the association among the Preamble numbers, the ranks, and the path loss is not limited to the association illustrated in FIG. 12. For example, the path loss level may include three or more types although FIG. 12 illustrates the cases of two types of the path loss level (large or small). In other words, the number of groups corresponding to the path loss may be three or more.

<Deciding Method 2-3>

As illustrated in FIG. 13, RACH configuration tables 301 and 401 according to Deciding Method 2-3 are, for example, tables in which Preamble numbers for the Preamble part in msg A, ranks to be applied to the Data part in msg A, and the information amount (e.g., the number of bits) of the Data part in msg A are associated with each other.

As illustrated in FIG. 13, a higher rank is configured for groups with a larger information amount of the Data part.

Note that the determination criteria of the information amount (criteria for determining whether the information amount is large or small, e.g., a threshold) may be, for example, specified or indicated by quasi-static indication information such as higher layer signaling, or dynamic indication information such as DCI.

In CBRA, Preamble number selector 302, for example, refers to RACH configuration table 301 illustrated in FIG. 13, and randomly selects a single Preamble number from the Preamble numbers included in the group corresponding to the information amount of the Data part in msg A. When the information amount is "small", for example, Preamble number selector 302 selects a single Preamble number from Preamble numbers 0 to 2 included in Group A illustrated in FIG. 13. Similarly, when the information amount is "large", for example, Preamble number selector 302 selects a single Preamble number from Preamble numbers 3 and 4 included in Group B illustrated in FIG. 13.

Meanwhile, in CFRA, for example, Preamble number selector 302 selects the Preamble number included in the DCI indicated from base station 400.

Note that the operations of rank decider 304 of terminal 300 and rank decider 402 of base station 400 are the same as those in Deciding Method 2-1, and the descriptions thereof are thus omitted.

As described above, the Preamble numbers for the Preamble part in msg A, the ranks applied to the Data part in msg A, and the information amount of the Data part in msg A are associated with each other in Deciding Method 2-3. This enables terminal 300 to decide the rank according to the information amount of the Data part, thereby eliminating the need for the control information to indicate the rank from base station 400 to terminal 300 and reducing the signaling amount.

Additionally, Deciding Method 2-3 enables terminal 300 to transmit the Data part using a higher rank when, for example, the information amount of the Data part in msg A is large, thereby reducing the number of symbols for the Data part in msg A.

Further, in Deciding Method 2-3, base station 400 can recognize the rank of the Data part in msg A selected in terminal 300 in detecting the Preamble, as in Deciding Method 2-1, and thus one or more ranks can be applied to the Data part in msg A even in CBRA, thereby increasing the information amount that can be transmitted in the Data part in msg A.

Note that the table illustrated in FIG. 13 is an example, and the association among the Preamble numbers, the ranks, and the information amount is not limited to the association illustrated in FIG. 13. For example, the information amount may include three or more types although FIG. 13 illustrates the cases of two types of the information amount (large or small). In other words, the number of groups corresponding to the information amount may be three or more.

The rank deciding methods according to the present embodiment have been described, thus far.

As described above, in the present embodiment, terminal 300 and base station 400 control the configuration of the Data part signal based on the Preamble number, which is one of the parameters relating to the PRACH signal transmission. For example, terminal 300 and base station 400 decide the number of resources (e.g., the rank or the number of antenna ports) for the reference signal (DMRS) to demodulate the data signal of the Data part based on the Preamble number.

This makes it possible to appropriately control the configuration of the reference signal (e.g., DMRS) of the Data part included in msg A and control the multi-layer transmission, for example, in the 2-step random access in NR. Thus, terminal 300 can efficiently transmit the PRACH signal in the 2-step random access according to the Preamble number, for example.

Variation 1 of Embodiment 2

Note that, in the present embodiment, the Preamble numbers for the Preamble part in msg A, the ranks to be applied to the Data part in msg A, and the combinations of the information amount of the Data part in msg A and the path loss may be associated with each other as illustrated in FIG. 14. As an example, groups of rank 2 are associated with a case where the information amount is "large" and the path loss is "small", and groups of rank 1 are associated with other cases from the above case, in FIG. 14. The use of RACH configuration tables 301 and 401 illustrated in FIG. 14 enables terminal 300 and base station 400 to select the rank according to the information amount of the Data part in msg A and the path loss.

Variation 2 of Embodiment 2

The present embodiment has described the cases where RACH configuration tables 301 and 401 include the rank value up to 2 (e.g., FIG. 11, FIG. 12, FIG. 13, and FIG. 14), as examples. RACH configuration tables 301 and 401, however, may include a rank higher than rank 2. For example, three groups respectively associated with ranks 1, 2 and 4 are configured to RACH configuration tables 301 and 401 illustrated in FIG. 15.

Variation 3 of Embodiment 2

The present embodiment has described RACH configuration tables 301 and 401 in which the Preamble numbers for the Preamble part in msg A and the ranks to be applied to the Data part in msg A are associated with each other. RACH configuration tables 301 and 401, however, may include the numbers of antenna ports instead of the ranks applied to the Data part in msg A.

Variation 4 of Embodiment 2

In CFRA, terminal 300 may apply a method of overwriting the rank with the rank indicated by downlink control information (DCI), rather than applying the association between the Preamble numbers and the ranks of the Data part of msg A as specified in RACH configuration tables 301 and 401. Applying the rank indicated by DCI enables more flexible control of the rank. For example, rank 2 cannot be assigned to a plurality of terminals when a single Preamble number is associated with rank 2 in RACH configuration tables 301 or 401. Terminal 300 can increase the number of terminals that can use rank 2 in CFRA, however, by preferentially applying the rank indicated by DCI, for example.

Variation 5 of Embodiment 2

The present embodiment has described RACH configuration tables 301 and 401 in which the Preamble numbers for the Preamble part in msg A and the ranks to be applied to the Data part in msg A are associated with each other. In RACH configuration tables 301 and 401, however, the ranks to be applied to the Data part may be associated with at least either one of time resources and frequency resources for PRACH, rather than the Preamble numbers.

In other words, terminal 300 and base station 400 may determine the number of resources for DMRS of the Data part (e.g., the ranks or the number of antenna ports) based on the resource to be used for PRACH signal transmission (e.g., the above-described Preamble number or the PRACH resource).

For example, the number of PRACH frequency resources is indicated to terminal 300 by the control information so-called "prach-FDM", which is higher layer signaling, and can be selected from 1, 2, 4, or 8 in NR. In addition, the resources for PRACH transmission are associated with a Synchronization Signal Block (SSB) index, which is an index of downlink synchronization signals.

Further, a single SSB index is associated with a plurality of PRACH resources (also referred to as RACH Occasions) in some cases, depending on the configuration value of the higher layer signaling. In this case, terminal 300 randomly selects a single resource from the plurality of PRACH resources.

When four PRACH resources (e.g., #0, 1, 2, and 3) are included and each resource is associated with a respective rank (e.g., 1, 1, 1, and 2), for example, terminal 300 may select a PRACH resource according to the selected rank, and transmit msg A. In the above example, when terminal 300 selects rank 1, terminal 300 randomly selects a single resource from the PRACH resources #0, 1, or 2, and transmits msg A, for example.

As described above, similar effects to those of the present embodiment can be obtained by associating the time/frequency resources for PRACH with the ranks applied to the Data part, as with the Preamble numbers.

Embodiment 3

Embodiment 1 and Embodiment 2 have described the methods of controlling the rank of the Data part in msg A. The present embodiment, in contrast, will describe methods of controlling resources (e.g., the number of symbols or the symbol position) for a reference signal (e.g., DMRS) of msg A.

The base station performs channel estimation in demodulating and decoding the Data part in msg A. Channel estimation methods includes, for example, a method using a reference signal to be mapped to the Data part in msg A and a method using a Preamble to be mapped to the Preamble part in msg A.

The Preamble is transmitted by a single antenna port. This prevents the base station from using the Preamble for the channel estimation when the Data part is transmitted by a plurality of antenna ports in cases of, for example, applying MIMO or transmission diversity (e.g., SFBC), thereby requiring the channel estimation using a reference signal.

As described above, for example, whether the Preamble can be used for the channel estimation depends on the number of antenna ports to be used for the transmission of the Data part. In other words, whether the Preamble can be used for the channel estimation depends on whether the number of antenna ports to be used for the transmission of the Data part and the number of antenna ports to be used for the transmission of the Preamble part are identical. Meanwhile, whether the Preamble can be used for the channel estimation depends on whether the precoding is identical between the Preamble part and the Data part.

Thus, in the present embodiment, descriptions will be given of methods of controlling the configuration of the resource for a reference signal (e.g., the number of symbols or the symbol position) according to whether the Preamble can be applied to the channel estimation in demodulating and decoding the Data part.

[Configuration of Terminal]

Figure 16:
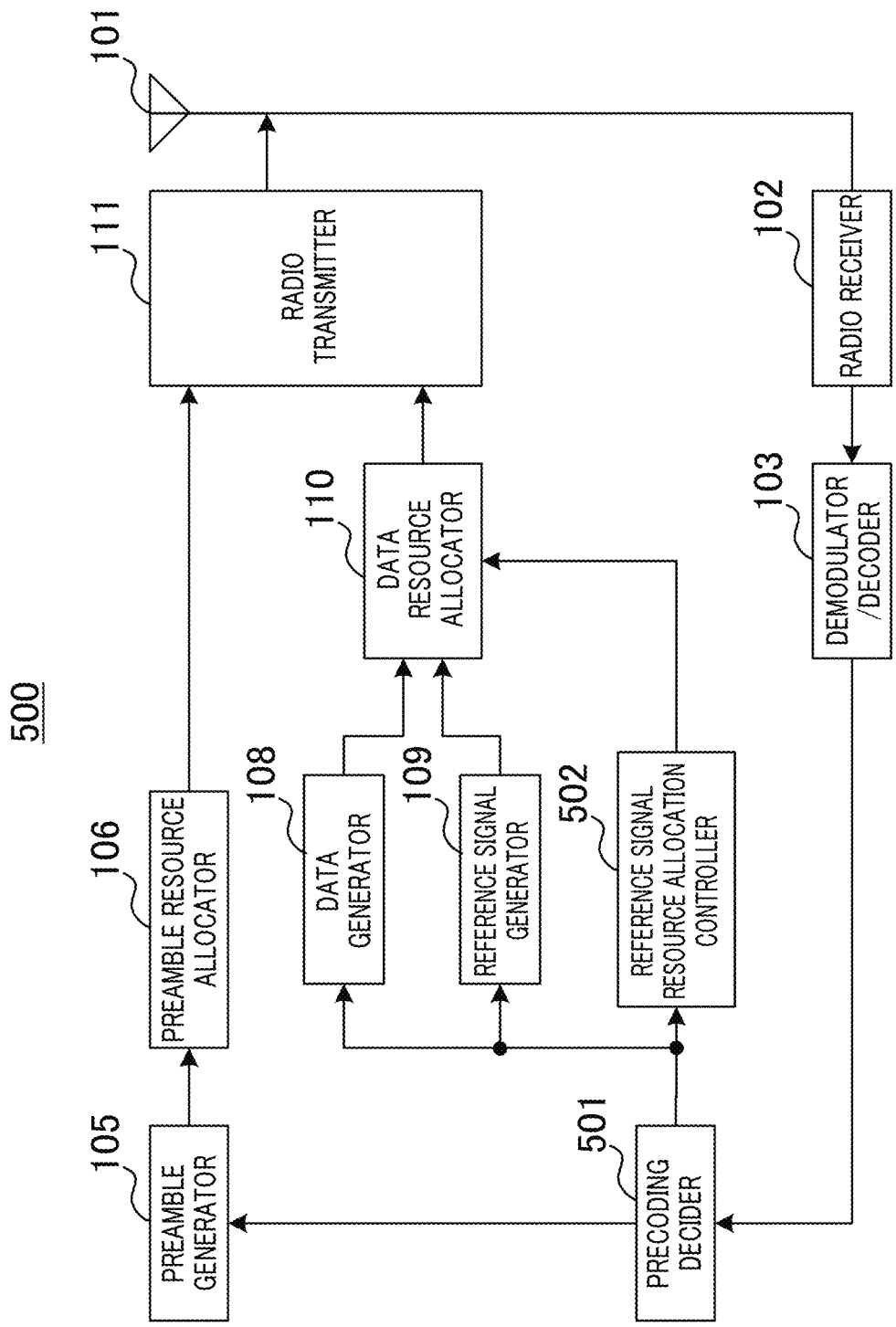
FIG. 16 is a block diagram illustrating a configuration of a terminal according to Embodiment 3.

FIG. 16 is a block diagram illustrating a configuration of terminal 500 according to the present embodiment. Note that, the same configurations as those in Embodiment 1 (FIG. 5) are denoted by the same reference signs in FIG. 16, and the descriptions thereof are omitted.

In terminal 500, Precoding decider 501 decides precoding methods for a Preamble part and a Data part in msg A based on the downlink control information to be inputted from demodulator/decoder 103. Precoding decider 501 outputs precoding information indicating the decided precoding methods for the Preamble part and the Data part, to Preamble generator 105, Data generator 108, and reference signal generator 109.

Each of Preamble generator 105, Data generator 108, and reference signal generator 109 controls precoding processing of a signal (e.g., a Preamble, a data signal, or a reference signal) based on the Precoding information to be inputted from Precoding decider 501.

Precoding decider 501 also outputs information indicating whether the precoding is identical between the Preamble part and the Data part, to reference signal resource allocation controller 502.

Note that exemplary methods of deciding the Precoding in Precoding decider 501 will be described later.

Reference signal resource allocation controller 502 controls a resource for a reference signal (e.g., at least either one of the number of symbols or symbol positions) according to whether the precoding is identical between the Preamble part and the Data part, which is indicated in the information to be inputted from Precoding decider 501. Reference signal resource allocation controller 502 outputs information indicating the decided resource for the reference signal to Data resource allocator 110. Data resource allocator 110 allocates the resource for the reference signal based on the information indicating the resource.

Note that exemplary methods of deciding the resource for the reference signal in reference signal resource allocation controller 502 will be described later.

[Configuration of Base Station]

Figure 17:
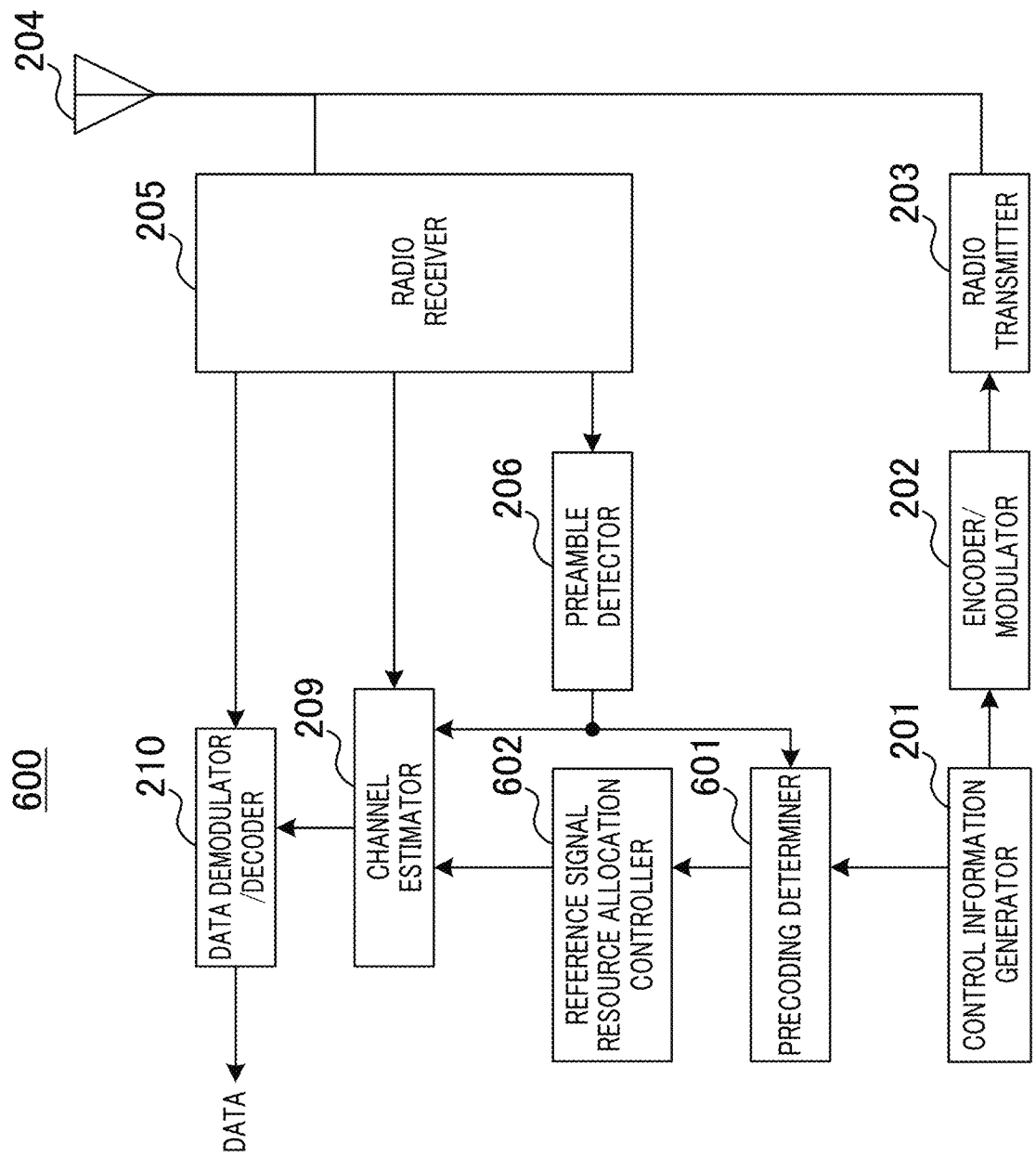
FIG. 17 is a block diagram illustrating a configuration of a base station according to Embodiment 3.

FIG. 17 is a block diagram illustrating a configuration of base station 600 according to the present embodiment. Note that, the same configurations as those in Embodiment 1 (FIG. 6) are denoted by the same reference signs in FIG. 17, and the descriptions thereof are omitted.

In base station 600, Precoding determiner 601 determines whether the precoding is identical between the Preamble part and the Data part in msg A based on the Preamble number to be inputted from Preamble detector 206 and the control information (e.g., the information used by terminal 500 for PRACH transmission) to be inputted from control information generator 201. Precoding determiner 601 outputs the determination result to reference signal resource allocation controller 602.

Reference signal resource allocation controller 602 controls the resource for the reference signal (e.g., at least either one of the number of symbols or symbol position) according to whether the precoding is identical between the Preamble part and the Data part, which is indicated in the information to be inputted from Precoding determiner 601. Reference signal resource allocation controller 602 outputs information indicating the decided resource for the reference signal to channel estimator 209. Channel estimator 209 identifies the resource to which the reference signal is assigned based on the information.

[Operations of Terminal 500 and Base Station 600]

Operation examples of terminal 500 and base station 600 including the above-described configurations will be described.

Figure 18:
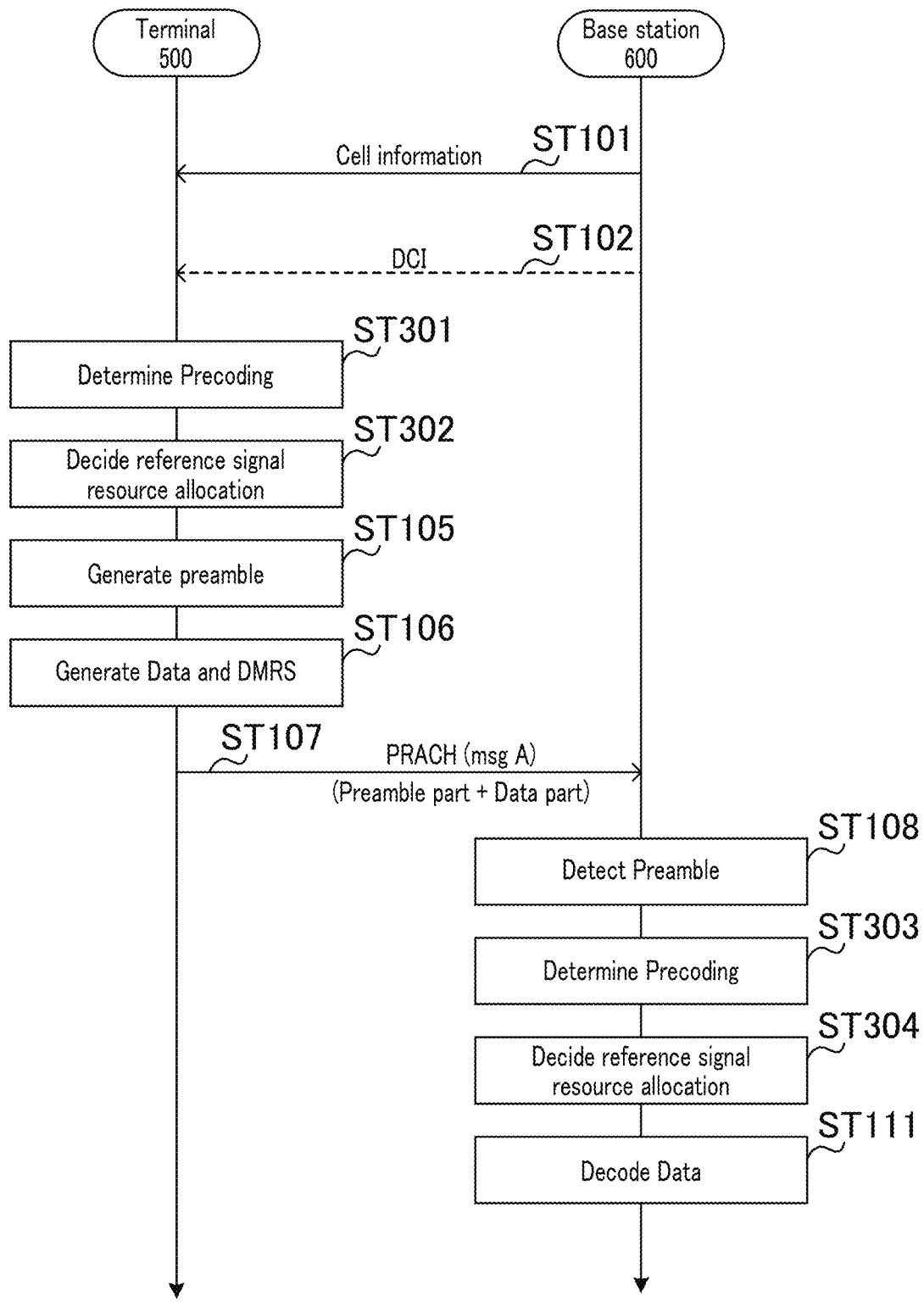
FIG. 18 is a sequence diagram illustrating exemplary operations of the terminal and the base station according to Embodiment 3.

FIG. 18 is a sequence diagram illustrating exemplary operations of terminal 500 (FIG. 16) and base station 600 (FIG. 17). Note that, the same operations as those in Embodiment 1 (see, for example, FIG. 7) are denoted by the same reference signs in FIG. 18, and the descriptions thereof are omitted.

In FIG. 18, terminal 500 decides the precoding methods for the Preamble part and the Data part in msg A based on, for example, higher layer signaling or downlink control information (DCI), and determines whether the precoding is identical between the Preamble part and the Data part (ST301).

Terminal 500 decides a reference signal resource allocation (e.g., the number of symbols or symbol position) according to whether the precoding is identical between the Preamble part and the Data part (ST302).

Meanwhile, base station 600 determines whether the precoding is identical between the Preamble part and the Data part based on the detected Preamble number and the information indicated to terminal 500 using the higher layer signaling or the downlink control information (ST303). Base station 600 then decides the reference signal resource allocation (e.g., the number of symbols or the symbol position) based on the determination result (ST304).

Next, descriptions will be given of examples of Precoding deciding (or determining) methods and reference signal resource allocation controlling method in terminal 500 and base station 600.

[Precoding Deciding and Determining Method]

As described above, the number of antenna ports for the Preamble part is 1.

Herein, Precoding decider 501 of terminal 500 determines whether the precoding is identical between the Preamble part and the Data part, for example, according to the number of antenna ports applying to transmission of the Data part in msg A. Note that the number of antenna ports may be indicated by higher layer signaling, for example.

When the number of antenna ports for the Data part is 1, for example, Precoding decider 501 applies the identical precoding method (e.g., random precoding, or no precoding) to the Preamble part and the Data part. Thus, Precoding decider 501 determines that the precoding is identical between the Preamble part and the Data part.

When the number of antenna ports for the Data part is more than 1, in contrast, Precoding decider 501 applies different precoding methods to the Preamble part and the Data part. For example, Precoding decider 501 applies random precoding or no precoding to the Preamble part and applies SVD precoding, for example, to the Data part. Thus, Precoding decider 501 determines that the precoding is not identical (i.e., different) between the Preamble part and the Data part.

Precoding determiner 601 of base station 600 determines whether the precoding is identical between the Preamble part and the Data part according to the number of antenna ports, which is indicated to terminal 500, to be applied to transmission of the Data part in msg A, as with Precoding decider 501.

Note that, in the case of CFRA, terminal 500 may determine whether the precoding is identical between the Preamble part and the Data part based on the number of antenna ports to be indicated by downlink control information (e.g., DCI) instead of higher layer signaling.

As described above, terminal 500 and base station 600 determines whether the precoding is identical between the Preamble part and the Data part based on the number of antenna ports for the Data part. For example, terminal 500 and base station 600 determine that the precoding is different between the Preamble part and the Data part when the number of antenna ports for the Data part is more than 1. This enables base station 600 to determine whether the Preamble can be applied to the channel estimation in demodulating and decoding the Data part without additional signaling, thereby reducing the signaling amount.

[Resource Allocation Control for Reference Signal]

Reference signal resource allocation controller 502 of terminal 500 and reference signal resource allocation controller 602 of base station 600 change the configuration of the reference signal (e.g., at least one of the number of symbols and the symbol position) according to whether the precoding is identical between the Preamble part and the Data part.

<Deciding Method for the Number of Symbols for Reference Signal>

For example, when the precoding is identical between the Preamble part and the Data part, terminal 500 and base station 600 configure the number of symbols for the reference signal to be smaller than the number of symbols for the reference signal when the precoding is different between the Preamble part and the Data part.

Terminal 500 and base station 600 configure the number of symbols for the reference signal as "X−1", for example, when the precoding is identical between the Preamble part and the Data part. In contrast, terminal 500 and base station 600 configure the number of symbols for the reference signal as "X" when the precoding is different between the Preamble part and the Data part.

As described above, changing the number of symbols for the reference signal, according to whether the precoding is identical between the Preamble part and the Data part, eliminates the need for additional signaling to indicate the number of symbols, thereby reducing the signaling amount.

Further, when the precoding is identical between the Preamble part and the Data part, in other words, when base station 600 can use the Preamble part for the channel estimation, the throughput can be improved by reducing the number of symbols for the reference signal and increasing the resources to which the data can be allocated. Note that the reduction of the number of symbols for the reference signal, when base station 600 uses the Preamble part for the channel estimation, causes little performance deterioration due to the deterioration of the channel estimation accuracy.

Note that X may be indicated from base station 600 to terminal 500 by quasi-static indication information or dynamic indication information (e.g., DCI), or may be specified as system common information and does not have to be indicated from base station 600 to terminal 500.

Further, the difference in the number of symbols to be configured according to whether the precoding is identical between the Preamble part and the Data part (e.g., the difference between X−1 and X) is not limited to one, and may include two or more.

<Deciding Method for Reference Signal Symbol Mapping>

For example, when the precoding is identical between the Preamble part and the Data part, terminal 500 and base station 600 configure the symbol position of the reference signal at the backward of the symbol position of the reference signal when the precoding is different between the Preamble part and the Data part.

In other words, when the precoding is identical between the Preamble part and the Data part, the symbol position of the reference signal is configured to be apart from the symbol position of the Preamble part, compared to the symbol position of the reference signal when the precoding is different between the Preamble part and the Data part.

Figure 19A:
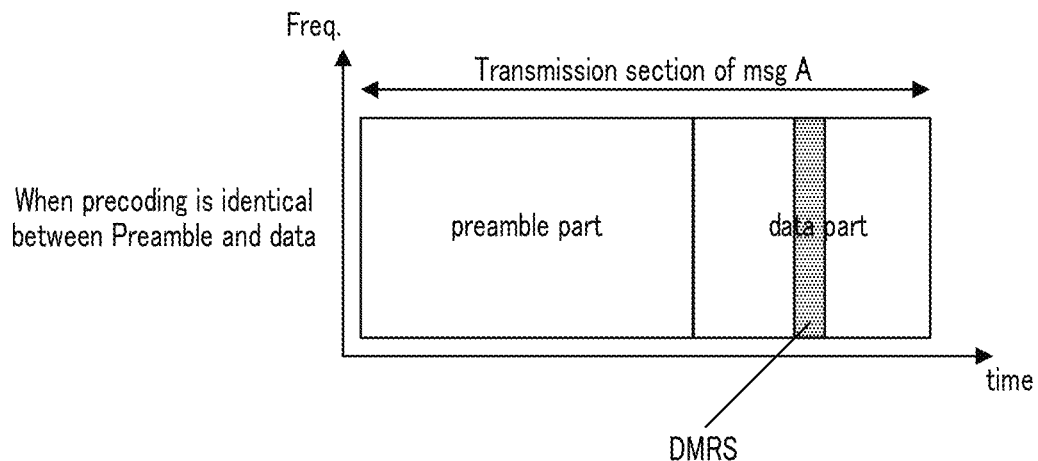
FIG. 19A illustrates an exemplary reference signal mapping according to Embodiment 3.

FIG. 19A illustrates an exemplary symbol position where the reference signal (e.g., DMRS) is mapped when the precoding is identical between the Preamble part and the Data part. Meanwhile, FIG. 19B illustrates an exemplary symbol position where the reference signal is mapped when the precoding is different between the Preamble part and the Data part.

As illustrated in FIG. 19A, the reference signal of the Data part is mapped apart from the symbol position of the Preamble part when the precoding is identical between the Preamble part and the Data part, that is, when the Preamble can be used as a channel estimate in data demodulation in base station 600. This improves the time interpolation accuracy of the channel estimation in base station 600, thereby preventing the deterioration of the channel estimation accuracy.

Figure 19B:
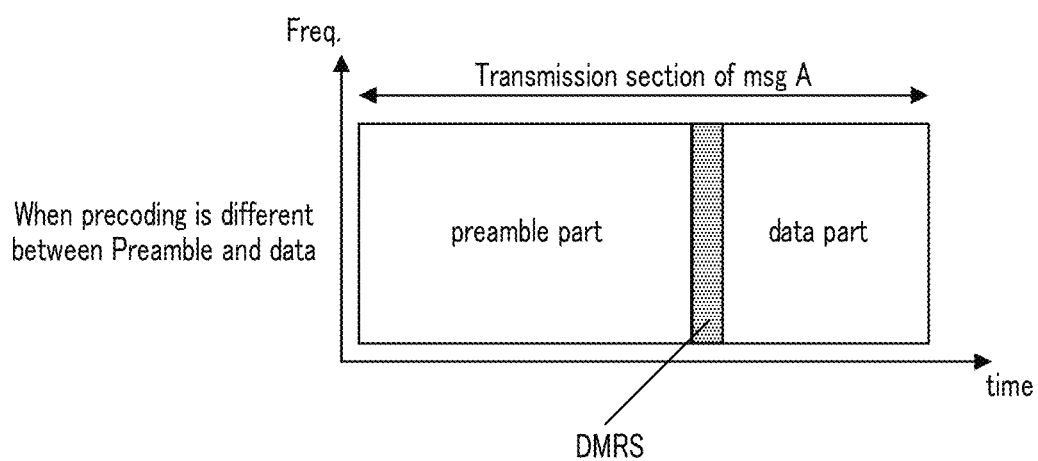
FIG. 19B illustrates another exemplary reference signal mapping according to Embodiment 3.

Further, as illustrated in FIG. 19B, the reference signal of the Data part is mapped at, for example, a symbol position of the head of the Data part when the precoding is different between the Preamble part and the Data part, that is, when the Preamble cannot be used as the channel estimate in the data demodulation in base station 600. This reduces the time required for the data demodulation in base station 600. Note that the symbol position of the reference signal of the Data part is not limited to the head of the Data part as illustrated in FIG. 19B.

Next, descriptions will be given of a method of using a mapping pattern table of a reference signal (DMRS) for PUSCH specified in NR, as an example.

Figure 20:
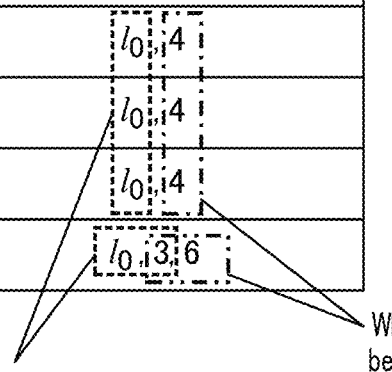
FIG. 20 illustrates an exemplary mapping pattern of DMRS in PUSCH.

FIG. 20 illustrates a part of a mapping pattern of DMRS for PUSCH (e.g., PUSCH mapping type B) specified in NR.

In FIG. 20, "Dmrs-Additional Position" is, for example, the number of symbols (two in FIG. 20) of additional DMRSs to be indicated by higher layer signaling. Further, in the PUSCH mapping type B illustrated in FIG. 20, the symbol position "$l_0$" is 0 (that is, the first symbol of PUSCH, i.e., a front-loaded position).

When the precoding is different between the Preamble part and the Data part, for example, the symbol position of the reference signal is configured in the first symbol position of PUSCH (the front-loaded position). For example, the first half of the symbol positions of the reference signal defined in FIG. 20 as a frame surrounded by a solid line (e.g., when the number of DMRSs in the Data part is 1), or a frame surrounded by a broken line (when the number of DMRSs in the Data part is 2) may be applied to the symbol position of the reference signal.

Further, when the precoding is identical between the Preamble part and the Data part, for example, as illustrated in a frame surrounded by a one-dot chain line (e.g., when the number of DMRSs in the Data part is 1) or a frame surrounded by a two-dot chain line (when the number of DMRSs in the Data part is 2) in FIG. 20, the symbol position subsequent to the first DMRS symbol (i.e., the latter half) may be applied to the symbol position of the reference signal while the first DMRS symbol is skipped.

Reference signal resource allocation controlling methods have been described, thus far.

As described above, in the present embodiment, terminal 500 and base station 600 control the configuration of the reference signal of the Data part (e.g., the symbol position or the number of symbols) based on the precoding method, which is one of the parameters relating to the PRACH signal transmission. This makes it possible to appropriately control the configuration of the reference signal (e.g., DMRS) of the Data part included in msg A, for example, in the 2-step random access in NR. Thus, terminal 500 can efficiently transmit the PRACH signal in the 2-step random access according to the precoding method, for example.

Embodiment 4

Embodiment 3 has described the methods of controlling the resource for the reference signal (e.g., the number of symbols or the symbol position) according to the precoding (or the number of antenna ports) to be applied to the transmission of the Data part in msg A. In contrast, the present embodiment describes the methods of controlling the resource for the reference signal of the Data part according to the resource for the preamble part in msg A (e.g., the preamble number, or the time or frequency resource for the preamble).

[Configuration of Terminal]

Figure 21:
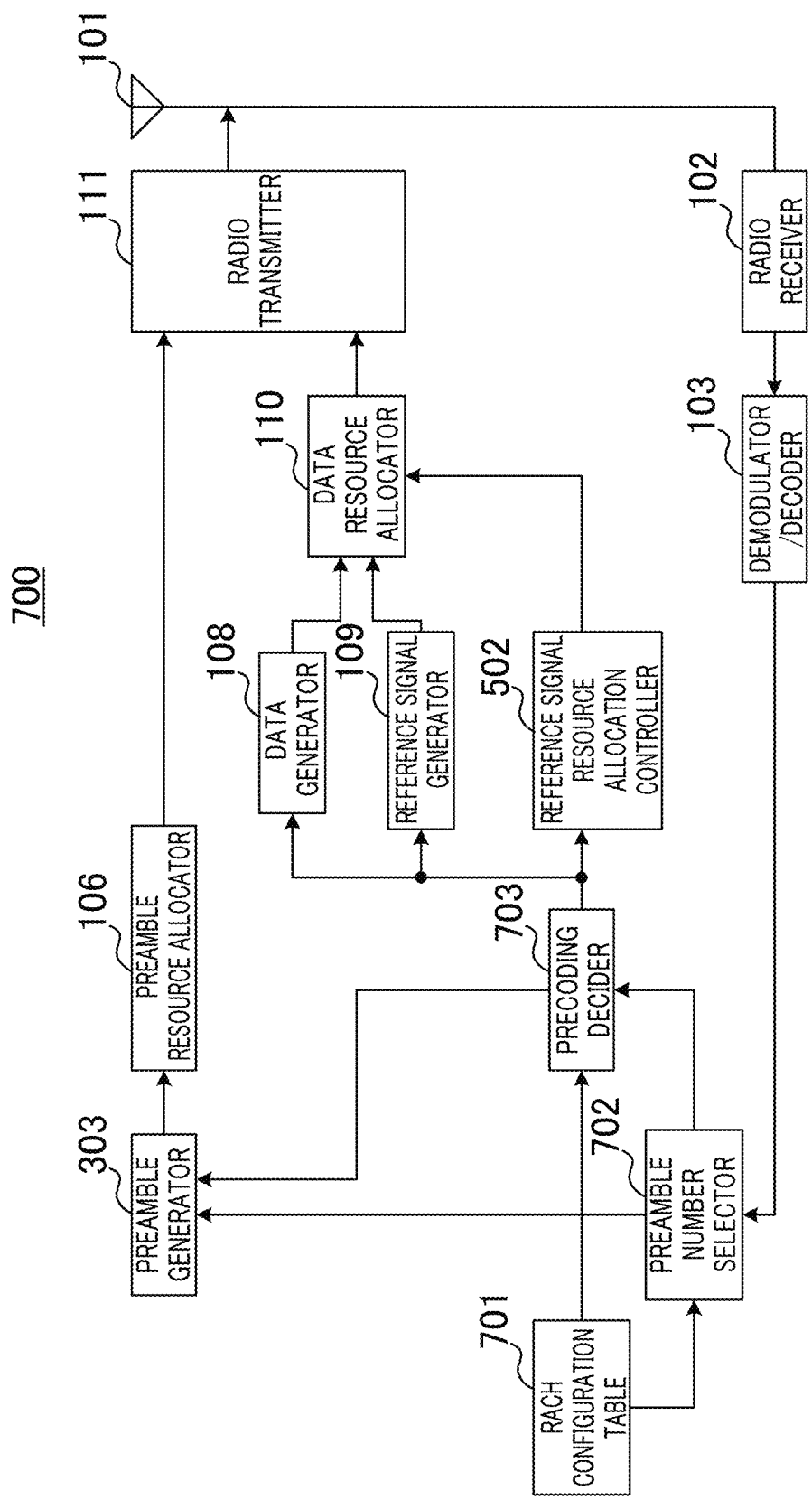
FIG. 21 is a block diagram illustrating a configuration of a terminal according to Embodiment 4.

FIG. 21 is a block diagram illustrating a configuration of terminal 700 according to the present embodiment. Note that, the same configurations as those in Embodiment 1 (FIG. 5), Embodiment 2 (FIG. 8), or Embodiment 3 (FIG. 16) are denoted by the same reference signs in FIG. 21, and the descriptions thereof are omitted.

In terminal 700, RACH configuration table 701 is a table of Preamble numbers grouped according to whether the precoding is identical between the Preamble part and the Data part in msg A (hereinafter, may be simply referred to as "precoding consistency"). The information included in RACH configuration table 701 may be indicated from base station 800 (to be described later) to terminal 700 by, for example, quasi-static indication information (e.g., higher layer signaling) or dynamic indication information (e.g., DCI). Alternatively, the information included in RACH configuration table 701 may be specified as system common information and does not have to be indicated from base station 800 to terminal 700.

The information included in RACH configuration table 701 is outputted to, for example, each of Preamble number selector 702 and Precoding decider 703. Note that examples of RACH configuration table 701 will be described later.

Preamble number selector 702 selects a Preamble number to be used for PRACH transmission. Preamble number selector 702 outputs Preamble information indicating the selected Preamble number, to Preamble generator 303 and Precoding decider 703.

When the RACH type is CBRA, Preamble number selector 702 refers to RACH configuration table 701 and randomly selects a single Preamble number from the Preamble numbers included in the group (the Preamble number group) associated with the precoding consistency, for example. When the RACH type is CFRA, in contrast, Preamble number selector 702 selects the Preamble number indicated by the downlink control information to be inputted from demodulator/decoder 103. Note that exemplary methods of selecting the Preamble number in Preamble number selector 702 will be described later.

Precoding decider 703 refers to RACH configuration table 701 and determines whether the precoding is identical between the Preamble part and the Data part (the precoding consistency) based on the Preamble number indicated in the Preamble information to be inputted from Preamble number selector 702. Precoding decider 703 also decides the precoding methods to be applied to the Preamble and the Data part.

Precoding decider 703 outputs the decided precoding methods to Preamble generator 303, Data generator 108, and reference signal generator 109. Precoding decider 703 also outputs information indicating whether the precoding is identical between the Preamble part and the Data part, to reference signal resource allocation controller 502.

Reference signal resource allocation controller 502 decides the resource for the reference signal based on the information indicating whether the precoding is identical between the Preamble part and the Data part to be inputted from Precoding decider 703, as is Embodiment 3. Note that reference signal resource allocation controller 502 may decide the resource for the reference signal by using the Preamble number to be inputted from Preamble number selector 702 and the information included in RACH configuration table 701, in the present embodiment.

[Configuration of Base Station]

Figure 22:
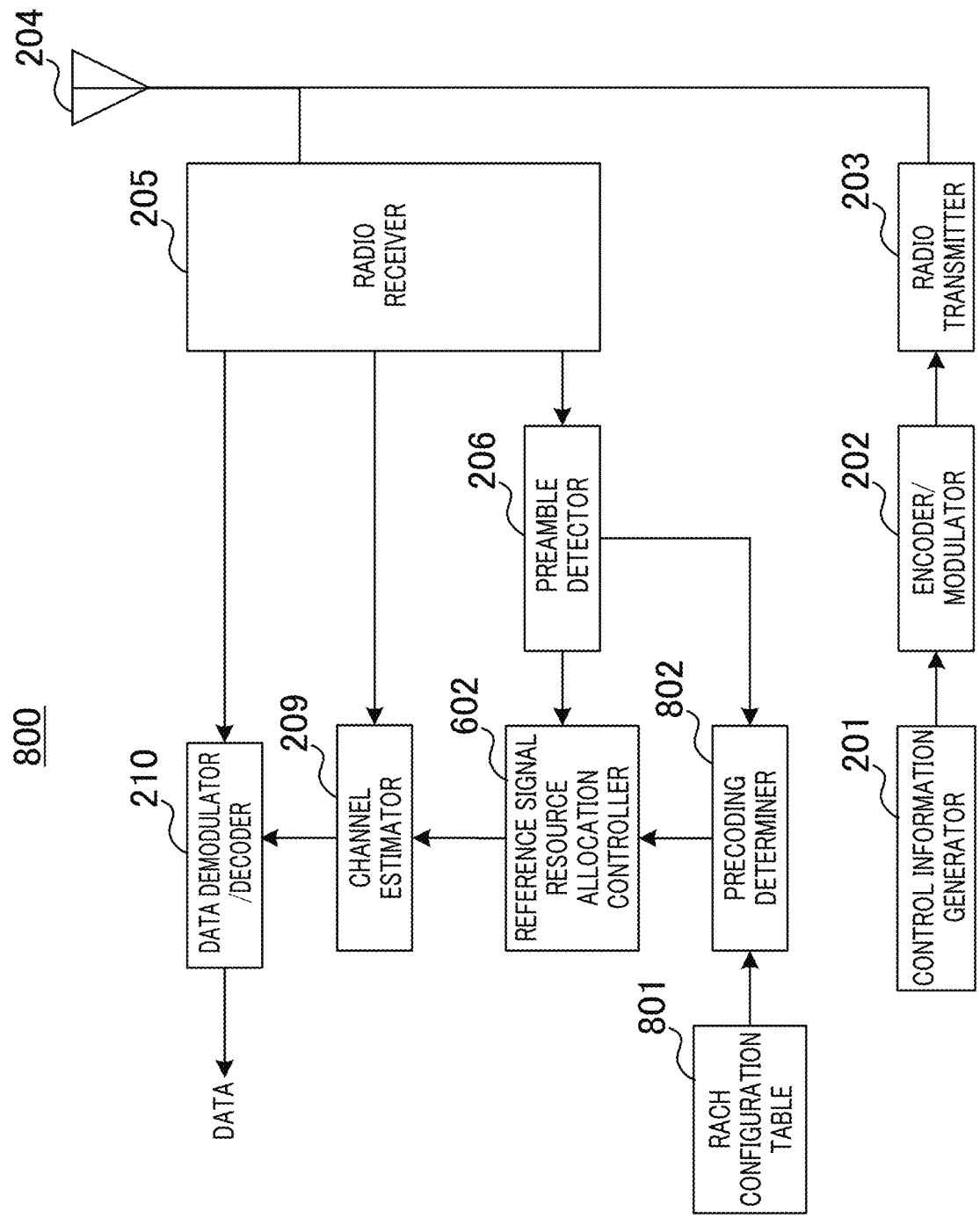
FIG. 22 is a block diagram illustrating a configuration of a base station according to Embodiment 4.

FIG. 22 is a block diagram illustrating a configuration of base station 800 according to the present embodiment. Note that, the same configurations as those in Embodiment 1 (FIG. 6), Embodiment 2 (FIG. 9), or Embodiment 3 (FIG. 17) are denoted by the same reference signs in FIG. 22, and the descriptions thereof are omitted.

In base station 800, RACH configuration table 801 is a table of Preamble numbers grouped according to whether the precoding is identical between the Preamble part and the Data part in msg A (i.e., the precoding consistency) as with RACH configuration table 701 included in terminal 700. The information included in RACH configuration table 801 is outputted to Precoding determiner 802, for example. Note that examples of RACH configuration table 801 will be described later.

Precoding determiner 802 refers to RACH configuration table 801 and determines whether the precoding is identical between the Preamble part and the Data part in msg A based on the Preamble number to be inputted from Preamble detector 206. Precoding determiner 802 outputs the determination result to reference signal resource allocation controller 602.

Reference signal resource allocation controller 602 decides the resource for the reference signal based on the information indicating whether the precoding is identical between the Preamble part and the Data part to be inputted from Precoding determiner 802, as in Embodiment 3. Note that reference signal resource allocation controller 602 may decide the resource for the reference signal by using the Preamble number to be inputted from Preamble number detector 206 and the information included in RACH configuration table 801, in the present embodiment.

[Operations of Terminal 700 and Base Station 800]

Operation examples of terminal 700 and base station 800 including the above-described configurations will be described.

Figure 23:
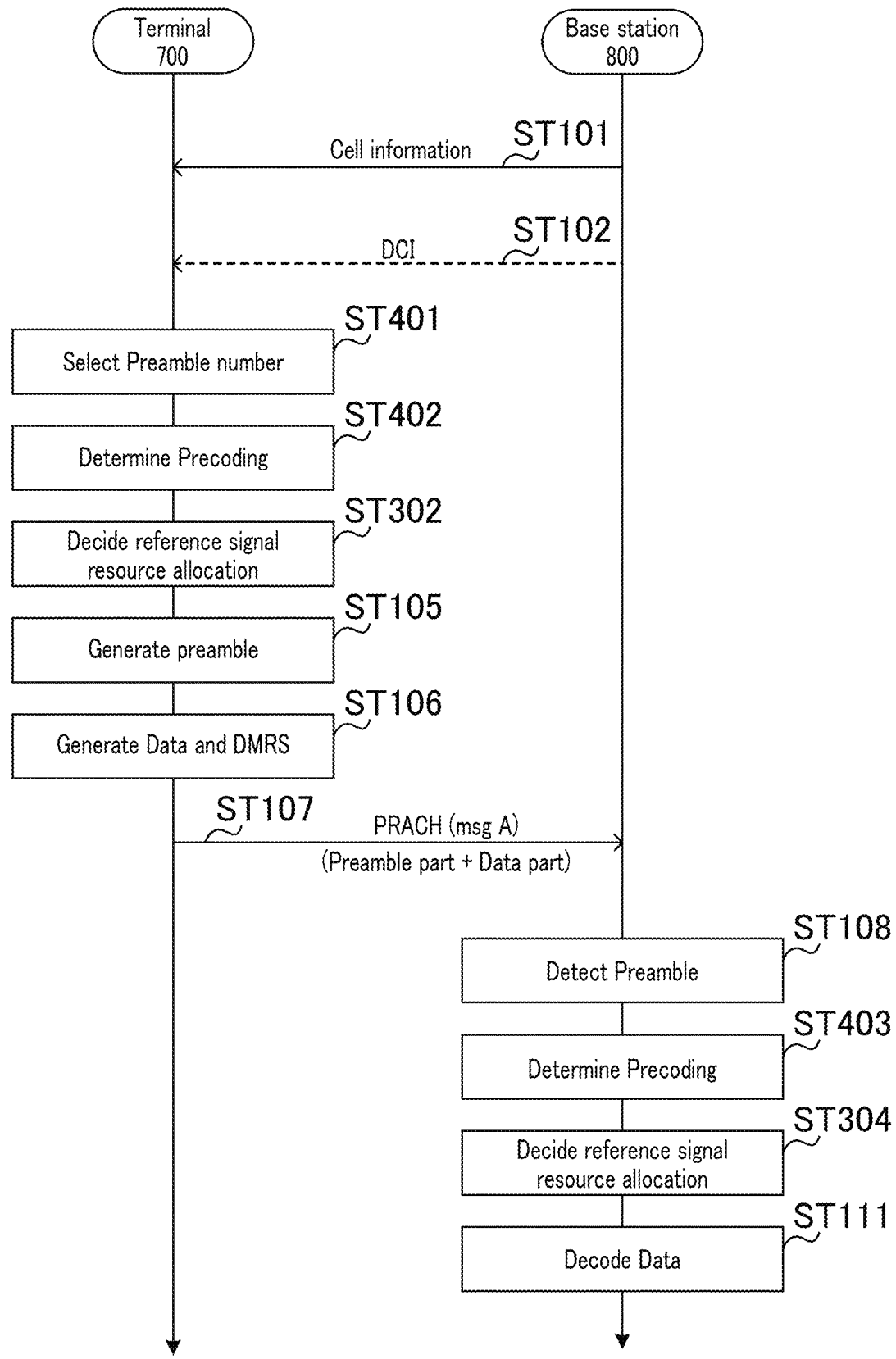
FIG. 23 is a sequence diagram illustrating exemplary operations of the terminal and the base station according to Embodiment 4.

FIG. 23 is a sequence diagram illustrating exemplary operations of terminal 700 (FIG. 21) and base station 800 (FIG. 22). Note that, the same operations as those in Embodiment 1 (e.g., see FIG. 7), Embodiment 2 (e.g., see FIG. 10), or Embodiment 3 (e.g., see FIG. 18) are denoted by the same reference signs in FIG. 23, and the descriptions thereof are omitted.

In FIG. 23, terminal 700 selects a Preamble number for msg A (ST401). In the case of CBRA, for example, terminal 700 refers to RACH configuration table 701 and randomly selects a single Preamble number from the group of Preamble numbers corresponding to the precoding methods for the Preamble part and the Data part in msg A. In the case of CFRA, in contrast, terminal 700 selects the Preamble number indicated by downlink control information (DCI).

Terminal 700 refers to RACH configuration table 701 and determines whether the decided precoding is identical between the Preamble part and the Data part based on the selected Preamble number (ST402).

Meanwhile, base station 800 refers to RACH configuration table 801 and determines whether the decided precoding is identical between the Preamble part and the Data part based on the detected Preamble number (ST403).

Next, descriptions will be given of examples of Precoding deciding (or determining) methods and reference signal resource allocation controlling methods in terminal 700 and base station 800.

Descriptions will also be given of configuration examples of RACH configuration tables 701 and 801, and operation examples of terminal 700 and base station 800.

Operation Example 1

FIG. 24 illustrates an example of RACH configuration tables 701 and 801 in Operation Example 1. As illustrated in FIG. 24, RACH configuration tables 701 and 801 are tables in which the Preamble number of the Preamble part in msg A and whether the precoding is identical between the Preamble part and the Data part in msg A (hereinafter, may be simply referred to as the precoding consistency) are associated with each other.

In the case of CBRA, for example, Preamble number selector 702 of terminal 700 determines whether to make the precoding identical between the Preamble part and the Data part in msg A, using at least one of the following information on terminal 700.

(1) The number of antenna ports for the Data part
(2) Difference between the required quality of the Data part and that of the Preamble part
(3) UE Capability (e.g., the number of transmission antennas)

Note that the required quality of the Data part may be determined from, for example, an MCS to be configured. Meanwhile, the required quality of the Preamble part may be determined from, for example, a Preamble format. In addition, the parameters to determine whether to make the precoding identical between the Preamble part and the Data part in msg A are not limited to the above information, and may also include other information.

Preamble number selector 702, for example, refers to RACH configuration table 701 illustrated in FIG. 24, and randomly selects a single Preamble number from the Preamble numbers included in each group, according to whether the precoding is identical between the Preamble part and the Data part in msg A.

When the precoding is identical between the Preamble part and the Data part in msg A, for example, Preamble number selector 702 selects a single Preamble number from Preamble numbers 0 and 1 included in Group A illustrated in FIG. 24. When the precoding is different between the Preamble part and the Data part in msg A, for example, Preamble number selector 702 selects a single Preamble number from Preamble numbers 2 to 4 included in Group B illustrated in FIG. 24.

In contrast, in the case of CFRA, for example, Preamble number selector 702 selects the Preamble number included in the DCI to be indicated from base station 800.

Precoding decider 703 of terminal 700 refers to RACH configuration table 701, and determines whether the precoding is identical between the Preamble part and the Data part in msg A from the Preamble number selected in Preamble number selector 702. As an example, when Preamble number 1 is selected in Preamble number selector 702 in FIG. 24, Precoding decider 703 determines that the precoding is identical between the Preamble part and the Data part in msg A. The same applies when another Preamble number is selected in Preamble number selector 702.

Note that Preamble number selector 702 determines whether the precoding is identical between the Preamble part and the Data part in msg A in Operation Example 1, and thus Precoding decider 703 may apply the determination result in Preamble number selector 702 as it is.

Meanwhile, Precoding determiner 802 of base station 800 refers to RACH configuration table 801, and determines whether the precoding is identical between the Preamble part and the Data part in msg A from the Preamble number detected in Preamble detector 206. As an example, when Preamble number 1 is detected in Preamble detector 206 in FIG. 24, Precoding determiner 802 determines that the precoding is identical between the Preamble part and the Data part in msg A. The same applies when another Preamble number is detected in Preamble detector 206.

Further, reference signal resource allocation controller 502 of terminal 700 and reference signal resource allocation controller 602 of base station 800 control the resource for the reference signal (e.g., at least one of the number of symbols and the symbol position) according to whether the precoding is identical between the Preamble part and the Data part, as in Embodiment 3.

As described above, the Preamble numbers of the Preamble part in msg A are associated with the precoding consistency between the Preamble part and the Data part in Operation Example 1. This eliminates the need for the control information to indicate information on the precoding consistency, thereby reducing the signaling amount.

Additionally, base station 800 can recognize the difference of the precoding (i.e., the precoding consistency) between the Preamble part and the Data part selected in terminal 700 in detecting the Preamble (e.g., the Preamble number). This enables to change the precoding for the Preamble part and the Data part for each terminal 700 even in CBRA. Thus, Operation Example 1 makes it possible to optimize the precoding control according to the reception quality or the UE capability of each terminal 700, for example, thereby improving the reception performance of the Data part.

Further, similar effects to those of Embodiment 3 can be obtained by changing the resource for the reference signal (e.g., the number of symbols for DMRS and the DMRS symbol position) according to the Preamble number of the Preamble part in msg A and the precoding consistency between the Preamble part and the Data part.

Note that the table illustrated in FIG. 24 is an example, and the association between the Preamble numbers and the ranks is not limited to the association illustrated in FIG. 24.

Operation Example 2

FIG. 25 illustrates an example of RACH configuration tables 701 and 801 in Operation Example 2. As illustrated in FIG. 25, RACH configuration tables 701 and 801 are tables in which the Preamble number of the Preamble part in msg A, the precoding consistency between the Preamble part and the Data part in msg A, and the number of symbols for a reference signal (e.g., DMRS) are associated with each other.

Preamble number selector 702 of terminal 700, for example, identifies (i.e., narrows down) the groups of Preamble numbers according to whether to make the precoding identical between the Preamble part and the Data part, as in Operation Example 1. For example, Preamble number selector 702 narrows down to Groups C and D in FIG. 25 when the precoding is different between the Preamble part and the Data part.

Preamble number selector 702 then decides the number of symbols for DMRS using, for example, at least one of the following information on terminal 700.

(1) Moving speed of terminal 700
(2) MCS
(3) Rank

When the moving speed of terminal 700 is fast (e.g., when the moving speed is equal to or greater than a threshold), for example, Preamble number selector 702 configures a larger number of symbols for DMRS in order to improve the time interpolation accuracy by increasing the number of symbols for the reference signal. Further, when the MCS of the Data part in msg A is high (e.g., when the MCS is equal to or greater than a threshold), or when the rank of the Data part in msg A is high (e.g., when the rank is equal to or greater than a threshold), for example, Preamble number selector 702 configures a larger number of symbols for DMRS in order to improve the channel estimation accuracy. Note that the parameters to decide the number of symbols for DMRS are not limited to the moving speed, MCS, and the rank, and may also include other parameters.

For example, in FIG. 25, when the precoding is different between the Preamble part and the Data part and the number of symbols for DMRS is large (e.g., two), Preamble number selector 702 randomly selects a single Preamble number from the Preamble numbers included in Group D.

As described above, in Operation Example 2, Preamble numbers of the Preamble part in msg A and the precoding consistency between the Preamble part and the Data part are associated, as in Operation Example 1. This eliminates the need for the control information to indicate whether the precoding is identical, thereby reducing the signaling amount.

Further, in Operation Example 2, the number of symbols for the reference signal can be configured according to the moving speed of terminal 700, MCS or the rank, thereby improving the reception performance of the Data part in msg A even in CBRA.

Note that the table illustrated in FIG. 25 is an example, and the association among the Preamble number, whether the precoding is identical between the Preamble part and the Data part, and the number of symbols for DMRS is not limited to the association illustrated in FIG. 25. For example, although FIG. 25 illustrates three types of DMRS symbol counts, two types or four or more types of DMRS symbol counts may be included. Additionally, the number of groups of the Preamble numbers may be five or more.

Further, as illustrated in FIG. 26, RACH configuration tables 701 and 801 may be, for example, tables in which Preamble numbers of the Preamble part in msg A, the precoding consistency between the Preamble part and the Data part in msg A, the number of symbols for DMRS, and the moving speed of terminal 700 (, MCS or ranks) are associated with each other. Note that the determination criteria of the moving speed (criteria for determining whether the moving speed is fast or slow, e.g., a threshold) may be specified, for example, or may be indicated by quasi-static indication information such as higher layer signaling, or dynamic indication information such as DCI.

Operation Example 1 and Operation Example 2 have been described, thus far.

As described above, in the present embodiment, terminal 700 and base station 800 control the configuration of the reference signal of the Data part (e.g., the number of symbols) based on the resource of the Preamble part (e.g., the Preamble number), which is one of the parameters relating to the PRACH signal transmission. This makes it possible to appropriately control the configuration of the reference signal (e.g., the number of symbols for DMRS) of the Data part included in msg A, for example, in the 2-step random access in NR. Thus, terminal 700 can efficiently transmit the PRACH signal in the 2-step random access according to the resource for the Preamble part, for example.

Each embodiment of the present disclosure has been described, thus far.

Other Embodiments (1) PRACH has been described as an example of transmission signals in the above embodiments. The transmission signals are, however, not limited to PRACH, and may be, for example, other signals to be transmitted from a terminal (corresponding to a transmission apparatus) to a base station (corresponding to a reception apparatus), or transmission signals to be transmitted from a base station (corresponding to the transmission apparatus) to a terminal (corresponding to the reception apparatus).

(2) In addition, each of the embodiments may be applied in combination. For example, a table illustrated in FIG. 27 may be used combining Embodiment 1 and Embodiment 2, which is defined by associating RACH types, preamble numbers, and the number of ranks for the Data part in msg A with each other. In this case, the maximum rank may be 1 in CBRA, and the maximum rank may be greater than 1 in CFRA.

(3) Further, although DMRS is used as an example of a reference signal in the embodiments described above, the reference signal is not limited to DMRS. The reference signal may be, for example, a Sounding Reference Signal (SRS) or a Phase Tracking Reference Signal (PT-RS).

Other embodiments have been described, thus far.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g., laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A transmission apparatus according to an embodiment of the present disclosure includes: transmission circuitry, which, in operation, transmits a random access signal including at least a data part; and control circuitry, which, in operation, controls a configuration of the data part based on a parameter relating to transmission of the random access signal.

In the transmission apparatus according to an embodiment of the present disclosure, the control circuitry controls a resource for a reference signal for demodulating a signal of the data part, based on a type of a random access procedure.

In the transmission apparatus according to an embodiment of the present disclosure, the control circuitry controls a resource for a reference signal for demodulating a signal of the data part, based on a resource used for transmission of the random access signal.

In the transmission apparatus according to an embodiment of the present disclosure, the control circuitry controls a resource for a reference signal for demodulating a signal of the data part, based on whether a first precoding for a preamble part included in the random access signal and a second precoding for the data part are identical with each other.

In the transmission apparatus according to an embodiment of the present disclosure, the resource for the reference signal is a number of symbols for the reference signal, and the number of symbols when the first precoding and the second precoding are identical with each other is smaller than the number of symbols when the first precoding and the second precoding are different from each other.

In the transmission apparatus according to an embodiment of the present disclosure, the resource for the reference signal is a symbol position of the reference signal, and the symbol position when the first precoding and the second precoding are identical with each other is a position backward of the symbol position when the first precoding and the second precoding are different from each other.

In the transmission apparatus according to an embodiment of the present disclosure, the first precoding and the second precoding are different from each other when a number of antenna ports used for the signal of the data part is more than one.

In the transmission apparatus according to an embodiment of the present disclosure, the control circuitry determines whether the first precoding and the second precoding are identical with each other based on a resource for the preamble part.

A reception apparatus according to an embodiment of the present disclosure includes: reception circuitry, which, in operation, receives a random access signal including at least a data part; and control circuitry, which, in operation, controls a configuration of the data part based on a parameter relating to transmission of the random access signal.

A transmission method according to an embodiment of the present disclosure includes: transmitting a random access signal including at least a data part; and controlling a configuration of the data part based on a parameter relating to transmission of the random access signal.

A reception method according to an embodiment of the present disclosure includes: receiving a random access signal including at least a data part; and controlling a configuration of the data part based on a parameter relating to transmission of the random access signal.

The disclosure of Japanese Patent Application No. 2018-247260, filed Dec. 28, 2018 including the specification, drawings, and abstract, is incorporated herein by reference in its entirety.

INDUSTRIAL APPLICABILITY

One embodiment of the present disclosure is useful in mobile communication systems.

REFERENCE SIGNS LIST 100, 300, 500, 700 Terminal
101, 204 Antenna
102, 205 Radio receiver
103 Demodulator/decoder
104, 207 RACH type determiner
105, 303 Preamble generator
106 Preamble resource allocator
107, 208, 304, 402 rank decider
108 Data generator
109 Reference signal generator
110 Data resource allocator
111, 203 Radio transmitter
200, 400, 600, 800 Base station
201 Control information generator
202 Encoder/modulator
206 Preamble detector
209 Channel estimator
210 Data demodulator/decoder 301, 401, 701, 801 RACH configuration table
302, 702 Preamble number selector
501, 703 Precoding decider
502, 602 Reference signal resource allocation controller
601, 802 Precoding determiner

The invention claimed is:

1. An integrated circuit for a communication apparatus, the integrated circuit comprising:
at least one input, which, inputs an electronic signal; and
controller circuitry, which, in operation, controls:
determining, based on a Random Access Channel (RACH) type, a number of ports used for a data part of a Message A transmission in 2-step random access procedure;
in a first case that the determined RACH type is Contention-Based Random Access (CBRA),
selecting a random access preambles group from a first random access preambles group or a second random access preambles group based on pathloss measured by the communication apparatus, each of random access preambles group being configured with one or more parameters including the number of ports used for the data part of the Message A transmission, respectively, and further selecting, randomly, a random access preamble from the selected random access preambles group; and
transmitting the selected random access preamble and the data part simultaneously in the Message A transmission using the number of ports configured for the selected random access preambles group; and
in a second case that the determined RACH type is Contention Free Random Access (CFRA);
determining the number of ports used for the data part of the Message A transmission based on a received control information; and
transmitting a random access preamble and the data part simultaneously in the Message A transmission using the number of ports indicated by the received control information.

2. The integrated circuit according to claim 1, wherein the one or more parameters include a demodulation reference signal configuration.

3. The integrated circuit according to claim 1, wherein the random access preambles group is selected, based on a data size of the data part of the Message A.

4. The integrated circuit according to claim 1, wherein the controller circuitry, in operation, controls selecting the random access preambles group based on whether the pathloss measured by the communication apparatus is less than a threshold which is specified by higher layer signaling.

* * * * *